(12) United States Patent
Gao et al.

(10) Patent No.: US 10,055,100 B2
(45) Date of Patent: Aug. 21, 2018

(54) METHOD AND APPARATUS FOR DISPLAYING RESOURCE INFORMATION

(71) Applicant: Huawei Technologies Co., Ltd., Shenzhen, Guangdong (CN)

(72) Inventors: Jian Gao, Shenzhen (CN); Jianbo Liang, Shenzhen (CN); Li Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 643 days.

(21) Appl. No.: 14/191,048

(22) Filed: Feb. 26, 2014

(65) Prior Publication Data

US 2014/0181718 A1 Jun. 26, 2014

Related U.S. Application Data

(63) Continuation of application No. PCT/CN2013/073777, filed on Apr. 7, 2013.

(30) Foreign Application Priority Data

Sep. 4, 2012 (CN) .......................... 2012 1 0323575

(51) Int. Cl.
*G06F 3/00* (2006.01)
*G06F 3/0484* (2013.01)
(Continued)

(52) U.S. Cl.
CPC ............ *G06F 3/0484* (2013.01); *H04L 41/22* (2013.01); *H04L 69/321* (2013.01); *H04L 41/0677* (2013.01); *H04L 41/5096* (2013.01)

(58) Field of Classification Search
CPC .. G05B 23/0267; G06F 9/5077; G06F 3/0484
(Continued)

(56) References Cited

U.S. PATENT DOCUMENTS 5,187,789 A * 2/1993 O'Hair ..................... G06F 8/20
6,249,755 B1 6/2001 Yemini et al.
(Continued)

FOREIGN PATENT DOCUMENTS

CN 1633079 A 6/2005
CN 1834886 A 9/2006
(Continued)

OTHER PUBLICATIONS

Pisa et al., "VNEXT: Virtual NEtwork management for Xen-based Testbeds," 2011 International Conference on the Network of the Future, Paris, France, pp. 41-45, Institute of Electrical and Electronics Engineers, New York, New York (Nov. 28-30, 2011).

*Primary Examiner* — Andrey Belousov
(74) *Attorney, Agent, or Firm* — Kilpatrick Townsend & Stockton

(57) ABSTRACT

Embodiments of the present invention provide a method and an apparatus for displaying resources. The method includes: presenting a first object set on a display device in a hierarchical manner of an application layer, a virtual layer, and a physical layer; and based on an input for a first object, prominently presenting, on the display device, an object having an association with the first object, where the first object belongs to the first object set. Using the method and the apparatus for displaying resources according to the embodiments of the present invention, when a fault occurs on a cloud computing network, a user can quickly locate a fault source and a related object, thereby improving efficiency of handling a cloud fault for the user.

21 Claims, 20 Drawing Sheets

(51) Int. Cl.
*H04L 12/24* (2006.01)
*H04L 29/08* (2006.01)

(58) Field of Classification Search
USPC .............................. 715/736, 737, 738, 771
See application file for complete search history.

(56) References Cited

U.S. PATENT DOCUMENTS

| | | | |
|---|---|---|---|
| 6,774,914 B1* | 8/2004 | Benayoun | G06F 3/04815 345/650 |
| 8,694,906 B2* | 4/2014 | Cole | G06F 3/0482 715/734 |
| 2005/0210330 A1* | 9/2005 | Platteter | G05B 23/0267 714/25 |
| 2010/0122175 A1* | 5/2010 | Gupta | H04L 41/22 715/735 |
| 2012/0278341 A1 | 11/2012 | Ogilvy et al. | |
| 2013/0019087 A1* | 1/2013 | Osaki | G06F 9/5077 713/1 |

FOREIGN PATENT DOCUMENTS

| | | |
|---|---|---|
| CN | 101047653 A | 10/2007 |
| CN | 101123517 A | 2/2008 |
| CN | 101292218 A | 10/2008 |
| CN | 101404541 A | 4/2009 |
| CN | 102035678 A | 4/2011 |
| CN | 102597991 A | 6/2012 |
| WO | WO 2011114623 A1 | 9/2011 |

\* cited by examiner

METHOD AND APPARATUS FOR DISPLAYING RESOURCE INFORMATION

CROSS-REFERENCE TO RELATED APPLICATIONS

This application is a continuation of International Patent Application No. PCT/CN2013/073777, filed on Apr. 7, 2013, which claims priority to Chinese Patent Application No. 201210323575.8, filed on Sep. 4, 2012, both of which are hereby incorporated by reference in their entireties.

TECHNICAL FIELD

The present invention relates to the communications field, and in particular to a method and an apparatus for displaying resource information.

BACKGROUND

Compared with a traditional information technology (Information Technology, "IT" for short), cloud computing involves no scenario in which maintenance personnel perform near-end corrective maintenance for computers. Generally, several maintenance personnel perform fault diagnoses and operations on a large number of virtual machines by using a virtual data maintenance system. A requirement of mobile operation and maintenance arises from the reduction of maintenance personnel. Learning cloud status and rectifying a fault anytime and anywhere are new technologies generated following cloudify.

However, when the maintenance is performed using mobile terminals instead of using personal computers (Personal Computer, "PC" for short), maintenance interface frames and menus are complicated, multiple ingresses exist, and logical relationships in a topology are unclear, due to differences in a screen size, a touch mode, and the like of the mobile terminals. In addition, a user concerns three dimensions, that is, an application, a virtual machine and a physical machine, during the maintenance, and a faulty object of any dimension may cause impacts on objects of other dimensions. Therefore, it is vital during the cloud maintenance to immediately locate a fault source and a related object and promptly rectify the fault. At present, most cloud computing topology views do not present such interconnections. Therefore, maintenance personnel need to perform multiple operations such as page switching and memorizing key information to determine relationships between elements. This process takes an extremely long time and affects the efficiency for the maintenance personnel to rectify a cloud fault.

SUMMARY

Embodiments of the present invention provide a method and an apparatus for displaying resources, which enable maintenance personnel to quickly locate a fault source and a related object, thereby improving efficiency of handling a cloud fault for the maintenance personnel.

According to a first aspect, a method for displaying resource information is provided, including:

presenting a first object set on a display device in a hierarchical manner of an application layer, a virtual layer, and a physical layer; and based on input for a first object, prominently presenting, on the display device, an object having an association with the first object, where the first object belongs to the first object set.

In combination with the first aspect, in a first possible implementation manner of the first aspect:

when the first object is an application, the object having an association with the first object includes a virtual resource corresponding to the first object and a physical resource that corresponds to the virtual resource corresponding to the first object;

when the first object is a physical resource, the object having an association with the first object includes a virtual resource corresponding to the first object and an application that corresponds to the virtual resource corresponding to the first object; and when the first object is a virtual resource, the object having an association with the first object includes an application corresponding to the first object and a physical resource corresponding to the first object.

In combination with the first aspect or the first possible implementation manner of the first aspect, in a second possible implementation manner of the first aspect, the presenting a first object set on a display device in a hierarchical manner of an application layer, a virtual layer, and a physical layer includes:

presenting the first object set in a manner where an upper layer, an intermediate layer, and a lower layer are isolated from each other in space, where the application layer is at the upper layer, the virtual layer is at the intermediate layer, the physical layer is at the lower layer, and a virtual tray is formed at the bottom of each layer to serve as a reference for object arrangement at the layer.

In combination with the second possible implementation manner of the first aspect, in a third possible implementation manner of the first aspect, the virtual tray further presents a prompt, and the prompt is used to indicate whether there is an unpresented object at a layer borne by the virtual tray.

In combination with the third possible implementation manner of the first aspect, in a fourth possible implementation manner of the first aspect, the prompt is of a thin thread shape, a separator is presented in the middle, and the separator is used to indicate a ratio of presented objects to unpresented objects at the layer borne by the virtual tray.

In combination with the first aspect, the first possible implementation manner of the first aspect, the second possible implementation manner of the first aspect, the third possible implementation manner of the first aspect, or the fourth possible implementation manner of the first aspect, in a fifth possible implementation manner of the first aspect, the presenting a first object set on a display device in a hierarchical manner of an application layer, a virtual layer, and a physical layer includes:

according to a fault level of a faulty object at a same layer in the first object set, arranging and presenting, in an area to which the same layer belongs on the display device, objects at the same layer.

In combination with the fifth possible implementation manner of the first aspect, in a sixth possible implementation manner of the first aspect, objects at different fault levels have different visual elements.

In combination with the fifth possible implementation manner of the first aspect or the sixth possible implementation manner of the first aspect, in a seventh possible implementation manner of the first aspect, the according to a fault level of a faulty object at a same layer in the first object set, arranging and presenting, in an area to which the same layer belongs on the display device, objects at the same layer, includes:

arranging an object at a relatively high fault level in a relatively front position in the area to which the same layer belongs, and when there are multiple objects at a same fault level, sorting the multiple objects at the same fault level according to initials of names or initials of Pinyin of names.

In combination with the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, or the seventh possible implementation manner of the first aspect, in an eighth possible implementation manner of the first aspect, the first object set includes a second object, the second object is a superior object of the first object, and the presenting a first object set on a display device in a hierarchical manner of an application layer, a virtual layer, and a physical layer includes:

when the display device presents the second object, presenting, based on input for the second object, a subordinate object included in the second object in an area to which a layer of the second object belongs; and when the presented subordinate object included in the second object excludes the first object, and the area to which the layer of the second object belongs presents a prompt indicating that not all subordinate objects included in the second object are presented, presenting, in a scroll manner and based on input for the area to which the layer of the second object belongs, a subordinate object that is not presented and is included in the second object in the area to which the layer of the second object belongs, until the first object is presented on the display device.

In combination with the eighth possible implementation manner of the first aspect, in a ninth possible implementation manner of the first aspect, before presenting a subordinate object included in the second object in an area to which a layer of the second object belongs, the presenting a first object set on a display device in a hierarchical manner of an application layer, a virtual layer, and a physical layer includes:

when the display device presents a peer object of the second object instead of presenting the second object, and the area to which the layer of the second object belongs presents a prompt indicating that not all subordinate objects included in a superior object of the second object are presented, presenting, in a scroll manner and based on input for the area to which the layer of the second object belongs, a subordinate object that is not presented and is included in the superior object of the second object in the area to which the layer of the second object belongs, until the second object is presented on the display device.

In combination with the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, the eighth possible implementation manner of the first aspect, or the ninth possible implementation manner of the first aspect, in a tenth possible implementation manner of the first aspect, the prominently presenting an object having an association with the first object in the first object set includes:

prominently presenting, on the display device, the object having an association with the first object, where the object having an association with the first object includes a third object; and prominently presenting, based on input for the third object, an object having an association with the first object among subordinate objects of the third object in an area to which a layer of the third object belongs.

In combination with the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, the eighth possible implementation manner of the first aspect, the ninth possible implementation manner of the first aspect, or the tenth possible implementation manner of the first aspect, in an eleventh possible implementation manner of the first aspect, the prominently presenting, on the display device, an object having an association with the first object includes:

prominently presenting the object having an association with the first object in at least one of the following manners: a manner of dynamically displaying the object having an association with the first object, a manner of changing a location of the object having an association with the first object, a manner of highlighting the object having an association with the first object, and a manner of dimming an object having no association with the first object.

According to a second aspect, a method for displaying resource information is provided, including:

presenting a first object set on a display device in a hierarchical manner of an application layer, a virtual layer, and a physical layer;

based on input for a first object, presenting property information of the first object on the display device, where the first object belongs to the first object set; and based on input for first property information, presenting sub-information of the first property information on the display device, where the first property information belongs to the property information of the first object.

In combination with the second aspect, in a first possible implementation manner of the second aspect, the presenting a first object set on a display device in a hierarchical manner of an application layer, a virtual layer, and a physical layer includes:

presenting the first object set in a manner where an upper layer, an intermediate layer, and a lower layer are isolated from each other in space, where the application layer is at the upper layer, the virtual layer is at the intermediate layer, the physical layer is at the lower layer, and a virtual tray is formed at the bottom of each layer to serve as a reference for object arrangement at the layer.

In combination with the second aspect, in a second possible implementation manner of the second aspect, the virtual tray further presents a prompt, and the prompt is used to indicate whether there is an unpresented object at a layer borne by the virtual tray.

In combination with the second possible implementation manner of the second aspect, in a third possible implementation manner of the second aspect, the prompt is of a thin thread shape, a separator is presented in the middle, and the separator is used to indicate a ratio of presented objects to unpresented objects at the layer borne by the virtual tray.

In combination with the second aspect, the first possible implementation manner of the second aspect, the second possible implementation manner of the second aspect, or the third possible implementation manner of the second aspect, in a fourth possible implementation manner of the second aspect, the presenting a first object set on a display device in a hierarchical manner of an application layer, a virtual layer, and a physical layer includes:

according to a fault level of a faulty object at a same layer in the first object set, arranging and presenting, in an area to which the same layer belongs on the display device, objects at the same layer.

In combination with the fourth possible implementation manner of the second aspect, in a fifth possible implementation manner of the second aspect, objects at different fault levels have different visual elements.

In combination with the fourth possible implementation manner of the second aspect or the fifth possible implementation manner of the second aspect, in a sixth possible implementation manner of the second aspect, the according to a fault level of a faulty object at a same layer in the first object set, arranging and presenting, in an area to which the same layer belongs on the display device, objects at the same layer, includes:

arranging an object at a relatively high fault level in a relatively front position in the area to which the same layer belongs, and when there are multiple objects at a same fault level, sorting the multiple objects at the same fault level according to initials of names or initials of Pinyin of names.

In combination with the second aspect, the first possible implementation manner of the second aspect, the second possible implementation manner of the second aspect, the third possible implementation manner of the second aspect, the fourth possible implementation manner of the second aspect, the fifth possible implementation manner of the second aspect, or the sixth possible implementation manner of the second aspect, in a seventh possible implementation manner of the second aspect, the first object set includes a second object, the second object is a superior object of the first object, and the presenting a first object set on a display device in a hierarchical manner of an application layer, a virtual layer, and a physical layer includes:

when the display device presents the second object, presenting, based on input for the second object, a subordinate object included in the second object in an area to which a layer of the second object belongs; and when the presented subordinate object included in the second object excludes the first object, and the area to which the layer of the second object belongs presents a prompt indicating that not all subordinate objects included in the second object are presented, presenting, in a scroll manner and based on input for the area to which the layer of the second object belongs, a subordinate object that is not presented and is included in the second object in the area to which the layer of the second object belongs, until the first object is presented on the display device.

In combination with the seventh possible implementation manner of the second aspect, in an eighth possible implementation manner of the second aspect, before presenting a subordinate object included in the second object in an area to which a layer of the second object belongs, the presenting a first object set on a display device in a hierarchical manner of an application layer, a virtual layer, and a physical layer includes:

when the display device presents a peer object of the second object instead of presenting the second object, and the area to which the layer of the second object belongs presents a prompt indicating that not all subordinate objects included in a superior object of the second object are presented, presenting, in a scroll manner and based on input for the area to which the layer of the second object belongs, a subordinate object that is not presented and is included in the superior object of the second object in the area to which the layer of the second object belongs, until the second object is presented on the display device.

In combination with the second aspect, the first possible implementation manner of the second aspect, the second possible implementation manner of the second aspect, the third possible implementation manner of the second aspect, the fourth possible implementation manner of the second aspect, the fifth possible implementation manner of the second aspect, the sixth possible implementation manner of the second aspect, the seventh possible implementation manner of the second aspect, or the eighth possible implementation manner of the second aspect, in a ninth possible implementation manner of the second aspect, the method further includes:

based on input for selecting a layer, presenting, on the display device, a resource consumption condition of the layer.

In combination with the second aspect, the first possible implementation manner of the second aspect, the second possible implementation manner of the second aspect, the third possible implementation manner of the second aspect, the fourth possible implementation manner of the second aspect, the fifth possible implementation manner of the second aspect, the sixth possible implementation manner of the second aspect, the seventh possible implementation manner of the second aspect, the eighth possible implementation manner of the second aspect, or the ninth possible implementation manner of the second aspect, in a tenth possible implementation manner of the second aspect, presented information is switched in a cube rotation manner.

According to a third aspect, an apparatus for displaying resource information is provided, including:

a first presenting unit, configured to present a first object set on a display device in a hierarchical manner of an application layer, a virtual layer, and a physical layer; and a second presenting unit, configured to, based on input for a first object, prominently present, on the display device, an object having an association with the first object, where the first object belongs to the first object set.

In combination with the third aspect, in a first possible implementation manner of the third aspect:

when the first object is an application, the object having an association with the first object includes a virtual resource corresponding to the first object and a physical resource that corresponds to the virtual resource corresponding to the first object;

when the first object is a physical resource, the object having an association with the first object includes a virtual resource corresponding to the first object and an application that corresponds to the virtual resource corresponding to the first object; and when the first object is a virtual resource, the object having an association with the first object includes an application corresponding to the first object and a physical resource corresponding to the first object.

In combination with the third aspect or the first possible implementation manner of the third aspect, in a second possible implementation manner of the third aspect, the first presenting unit is specifically configured to:

present the first object set in a manner where an upper layer, an intermediate layer, and a lower layer are isolated from each other in space, where the application layer is at the upper layer, the virtual layer is at the intermediate layer, the physical layer is at the lower layer, and a virtual tray is formed at the bottom of each layer to serve as a reference for object arrangement at the layer.

In combination with the second possible implementation manner of the third aspect, in a third possible implementation manner of the third aspect, the virtual tray further presents a prompt, and the prompt is used to indicate whether there is an unpresented object at a layer borne by the virtual tray.

In combination with the third possible implementation manner of the third aspect, in a fourth possible implementation manner of the third aspect, the prompt is of a thin thread shape, a separator is presented in the middle, and the separator is used to indicate a ratio of presented objects to unpresented objects at the layer borne by the virtual tray.

In combination with the third aspect, the first possible implementation manner of the third aspect, the second possible implementation manner of the third aspect, the third possible implementation manner of the third aspect, or the fourth possible implementation manner of the third aspect, in a fifth possible implementation manner of the third aspect, the first presenting unit is specifically configured to:

according to a fault level of a faulty object at a same layer in the first object set, arrange and present, in an area to which the same layer belongs on the display device, objects at the same layer.

In combination with the fifth possible implementation manner of the third aspect, in a sixth possible implementation manner of the third aspect, objects at different fault levels have different visual elements.

In combination with the fifth possible implementation manner of the third aspect or the sixth possible implementation manner of the third aspect, in a seventh possible implementation manner of the third aspect, the first presenting unit is specifically configured to:

according to a fault level of a faulty object at a same layer in the first object set, arrange and present, in an area to which the same layer belongs on the display device, objects at the same layer, where an object at a relatively high fault level is arranged in a relatively front position in the area to which the same layer belongs, and when there are multiple objects at a same fault level, the multiple objects at the same fault level are sorted according to initials of names or initials of Pinyin of names.

In combination with the third aspect, the first possible implementation manner of the third aspect, the second possible implementation manner of the third aspect, the third possible implementation manner of the third aspect, the fourth possible implementation manner of the third aspect, the fifth possible implementation manner of the third aspect, the sixth possible implementation manner of the third aspect, or the seventh possible implementation manner of the third aspect, in an eighth possible implementation manner of the third aspect, the first presenting unit includes:

a first presenting subunit, configured to, when the display device presents the second object, present, based on input for the second object, a subordinate object included in the second object in an area to which a layer of the second object belongs, where the first object set includes the second object, and the second object is a superior object of the first object; and when the presented subordinate object included in the second object excludes the first object, and the area to which the layer of the second object belongs presents a prompt indicating that not all subordinate objects included in the second object are presented, present, in a scroll manner and based on input for the area to which the layer of the second object belongs, a subordinate object that is not presented and is included in the second object in the area to which the layer of the second object belongs, until the first object is presented on the display device.

In combination with the eighth possible implementation manner of the third aspect, in a ninth possible implementation manner of the third aspect, the first presenting unit further includes:

a second presenting subunit, configured to, when the display device presents a peer object of the second object instead of presenting the second object, and the area to which the layer of the second object belongs presents a prompt indicating that not all subordinate objects included in a superior object of the second object are presented, present, in a scroll manner and based on input for the area to which the layer of the second object belongs, a subordinate object that is not presented and is included in the superior object of the second object in the area to which the layer of the second object belongs, until the second object is presented on the display device.

In combination with the third aspect, the first possible implementation manner of the third aspect, the second possible implementation manner of the third aspect, the third possible implementation manner of the third aspect, the fourth possible implementation manner of the third aspect, the fifth possible implementation manner of the third aspect, the sixth possible implementation manner of the third aspect, the seventh possible implementation manner of the third aspect, the eighth possible implementation manner of the third aspect, or the ninth possible implementation manner of the third aspect, in a tenth possible implementation manner of the third aspect, the second presenting unit includes:

a third presenting subunit, configured to prominently present, on the display device, the object having an association with the first object, where the object having an association with the first object includes a third object; and a fourth presenting subunit, configured to prominently present, based on input for the third object, an object having an association with the first object among subordinate objects of the third object in the area to which the layer of the third object belongs.

In combination with the third aspect, the first possible implementation manner of the third aspect, the second possible implementation manner of the third aspect, the third possible implementation manner of the third aspect, the fourth possible implementation manner of the third aspect, the fifth possible implementation manner of the third aspect, the sixth possible implementation manner of the third aspect, the seventh possible implementation manner of the third aspect, the eighth possible implementation manner of the third aspect, the ninth possible implementation manner of the third aspect, or the tenth possible implementation manner of the third aspect, in an eleventh possible implementation manner of the third aspect, the second presenting unit is specifically configured to:

prominently present the object having an association with the first object in at least one of the following manners: a manner of dynamically displaying the object having an association with the first object, a manner of changing a location of the object having an association with the first object, a manner of highlighting the object having an association with the first object, and a manner of dimming an object having no association with the first object.

According to a fourth aspect, an apparatus for displaying resource information is provided, including:

a first presenting unit, configured to present a first object set on a display device in a hierarchical manner of an application layer, a virtual layer, and a physical layer;

a second presenting unit, configured to, based on input for a first object, present property information of the first object on the display device, where the first object belongs to the first object set; and a third presenting unit, configured to, based on input for first property information, present sub-information of the first property information on the display device, where the first property information belongs to the property information of the first object.

In combination with the fourth aspect, in a first possible implementation manner of the fourth aspect, the first presenting unit is specifically configured to:

present the first object set in a manner where an upper layer, an intermediate layer, and a lower layer are isolated from each other in space, where the application layer is at the upper layer, the virtual layer is at the intermediate layer, the physical layer is at the lower layer, and a virtual tray is formed at the bottom of each layer to serve as a reference for object arrangement at the layer.

In combination with the fourth aspect, in a second possible implementation manner of the fourth aspect, the virtual tray further presents a prompt, and the prompt is used to indicate whether there is an unpresented object at a layer borne by the virtual tray.

In combination with the second possible implementation manner of the fourth aspect, in a third possible implementation manner of the fourth aspect, the prompt is of a thin thread shape, a separator is presented in the middle, and the separator is used to indicate a ratio of presented objects to unpresented objects at the layer borne by the virtual tray.

In combination with the fourth aspect, the first possible implementation manner of the fourth aspect, the second possible implementation manner of the fourth aspect, or the third possible implementation manner of the fourth aspect, in a fourth possible implementation manner of the fourth aspect, the first presenting unit is specifically configured to:

according to a fault level of a faulty object at a same layer in the first object set, arrange and present, in an area to which the same layer belongs on the display device, objects at the same layer.

In combination with the fourth possible implementation manner of the fourth aspect, in a fifth possible implementation manner of the fourth aspect, objects at different fault levels have different visual elements.

In combination with the fourth possible implementation manner of the fourth aspect or the fifth possible implementation manner of the fourth aspect, in a sixth possible implementation manner of the fourth aspect, the first presenting unit is specifically configured to:

according to the fault level of the faulty object at the same layer in the first object set, arrange and present, in the area to which the same layer belongs on the display device, the objects at the same layer, where an object at a relatively high fault level is arranged in a relatively front position in the area to which the same layer belongs, and when there are multiple objects at a same fault level, the multiple objects at the same fault level are sorted according to initials of names or initials of Pinyin of names.

In combination with the fourth aspect, the first possible implementation manner of the fourth aspect, the second possible implementation manner of the fourth aspect, the third possible implementation manner of the fourth aspect, the fourth possible implementation manner of the fourth aspect, the fifth possible implementation manner of the fourth aspect, or the sixth possible implementation manner of the fourth aspect, in a seventh possible implementation manner of the fourth aspect, the first presenting unit includes:

a first presenting subunit, configured to, when the display device presents the second object, present, based on input for the second object, a subordinate object included in the second object in an area to which a layer of the second object belongs, where the first object set includes the second object, and the second object is a superior object of the first object; and when the presented subordinate object included in the second object excludes the first object, and the area to which the layer of the second object belongs presents a prompt indicating that not all subordinate objects included in the second object are presented, present, in a scroll manner and based on input for the area to which the layer of the second object belongs, a subordinate object that is not presented and is included in the second object in the area to which the layer of the second object belongs, until the first object is presented on the display device.

In combination with the seventh possible implementation manner of the fourth aspect, in an eighth possible implementation manner of the fourth aspect, the first presenting unit further includes:

a second presenting subunit, configured to, when the display device presents a peer object of the second object instead of presenting the second object, and the area to which the layer of the second object belongs presents a prompt indicating that not all subordinate objects included in a superior object of the second object are presented, present, in a scroll manner and based on input for the area to which the layer of the second object belongs, a subordinate object that is not presented and is included in the superior object of the second object in the area to which the layer of the second object belongs, until the second object is presented on the display device.

In combination with the fourth aspect, the first possible implementation manner of the fourth aspect, the second possible implementation manner of the fourth aspect, the third possible implementation manner of the fourth aspect, the fourth possible implementation manner of the fourth aspect, the fifth possible implementation manner of the fourth aspect, the sixth possible implementation manner of the fourth aspect, the seventh possible implementation manner of the fourth aspect, or the eighth possible implementation manner of the fourth aspect, in a ninth possible implementation manner of the fourth aspect, the apparatus further includes:

a fourth presenting unit 440, configured to, based on input for selecting a layer. present, on the display device, a resource consumption condition of the layer.

In combination with the fourth aspect, the first possible implementation manner of the fourth aspect, the second possible implementation manner of the fourth aspect, the third possible implementation manner of the fourth aspect, the fourth possible implementation manner of the fourth aspect, the fifth possible implementation manner of the fourth aspect, the sixth possible implementation manner of the fourth aspect, the seventh possible implementation manner of the fourth aspect, the eighth possible implementation manner of the fourth aspect, or the ninth possible implementation manner of the fourth aspect, in a tenth possible implementation manner of the fourth aspect, presented information is switched in a cube rotation manner.

Therefore, in the embodiments of the present invention, a first object set is presented on a display device in a hierarchical manner of an application layer, a virtual layer, and a physical layer, and based on input for a first object, an object having an association with the first object is prominently presented on the display device, so that logical connection relationships between objects on a cloud computing network can be clearly displayed to a user. In this way, when a fault occurs on the cloud computing network, the user can quickly locate a fault source and a related object, thereby improving efficiency of handling a cloud fault for the user.

BRIEF DESCRIPTION OF DRAWINGS

To illustrate the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The term "and/or" in this application indicates only an association between associated objects, and represents that three relationships may exist, for example, A and/or B may represent the following three cases: Only A exists, both A and B exist, and only B exists. In addition, the character "/" in this document generally represents that the former and later associated objects are in an "or" relationship.

Figure 1:
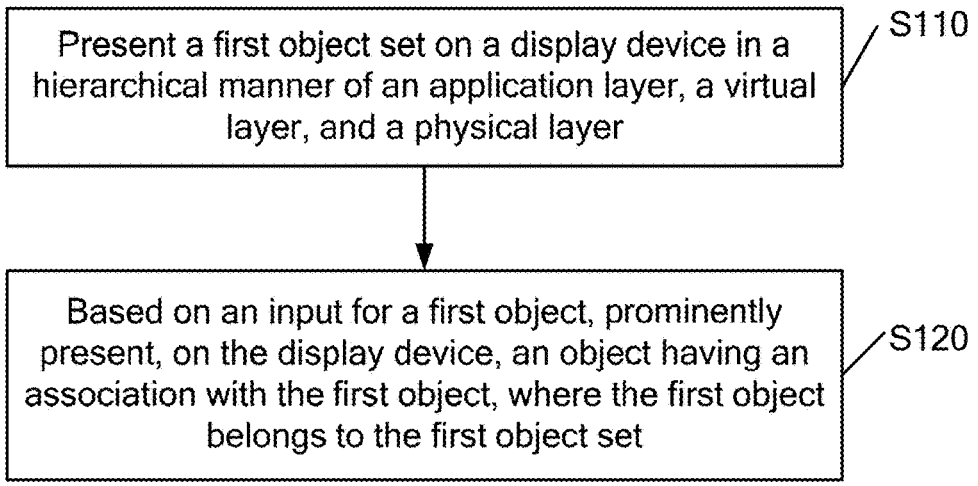
FIG. 1 is a schematic flowchart of a method for displaying resource information according to an embodiment of the present invention.

The following describes a schematic flowchart of a method for displaying resource information 100 according to an embodiment of the present invention with reference to FIG. 1. As shown in FIG. 1, the method 100 includes:

S110. Present a first object set on a display device in a hierarchical manner of an application layer, a virtual layer, and a physical layer.

S120. Based on input for a first object, prominently present, on the display device, an object having an association with the first object, where the first object belongs to the first object set.

Figure 2A:
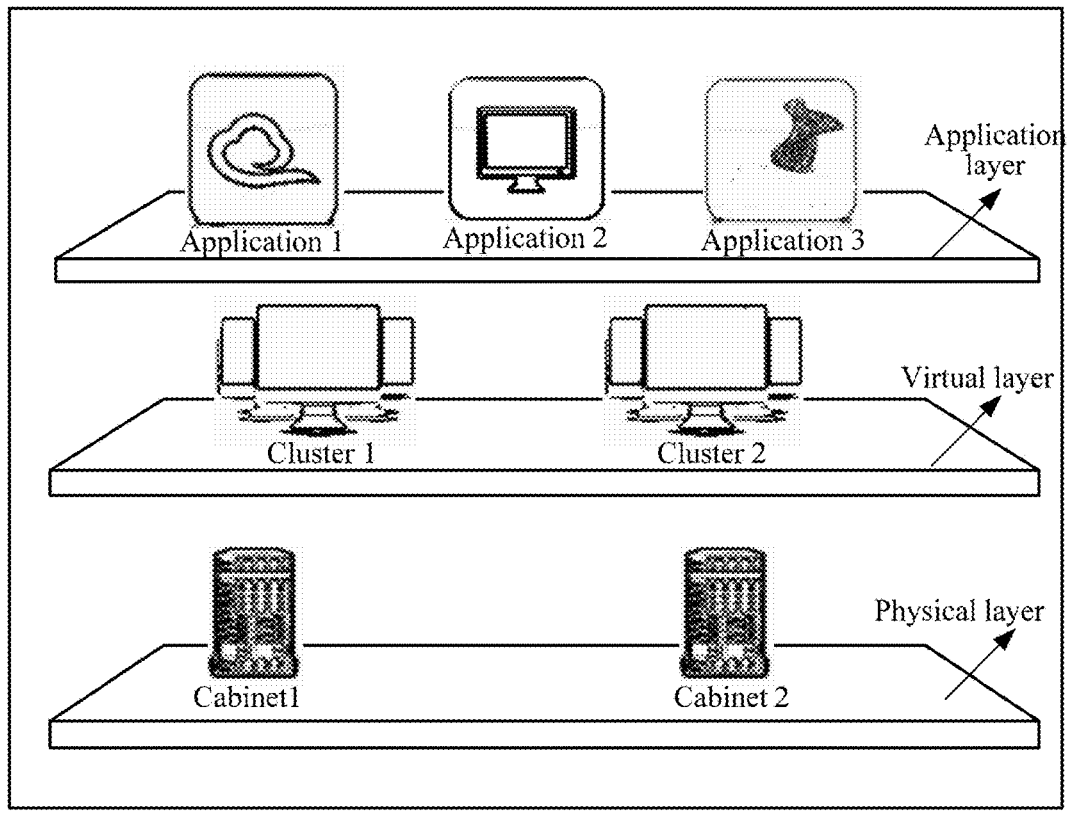
FIG. 2a and FIG. 2b are schematic diagrams of resource displaying according to an embodiment of the present invention.

Specifically, after detecting an input signal of a user, a mobile terminal may display related objects of cloud computing, that is, the first object set, to the user, where the mobile terminal may present the related objects of cloud-computing on its display device in a manner of an application layer, a virtual layer, and a physical layer. For example, as shown in FIG. 2a, the first object set is divided into an application layer including application 1, application 2, and application 3, a virtual layer including cluster 1 and cluster 2, and a physical layer including cabinet 1 and cabinet 2. Then, the user may select a certain first object from the related objects of cloud computing presented in hierarchy. After detecting input of the user for the first object (for example, application 1 shown in FIG. 2a), the mobile terminal may prominently present, on its display device, an object having an association with the first object.

Therefore, in the embodiment of the present invention, a first object set is presented on a display device in a hierarchical manner of an application layer, a virtual layer, and a physical layer, and based on input for a first object, an object having an association with the first object is prominently presented on the display device, so that logical connection relationships between objects on a cloud computing network can be clearly displayed to a user. In this way, when a fault occurs on the cloud computing network, the user can quickly locate a fault source and a related object, thereby improving efficiency of handling a cloud fault for the user.

In the embodiment of the present invention, the prominently presenting the object having an association with the first object may be implemented in various manners: for example, a manner of dynamically displaying the object having an association with the first object, a manner of changing a location of the object having an association with the first object, a manner of dimming an object having no association with the first object, or a manner of highlighting the object having an association with the first object. There may be various manners of dynamically displaying object having an association with the first object: For example, when receiving an input signal for the first object, the mobile terminal may dynamically display the object having an association with the first object in a manner of flickering for a predetermined time, or dynamically display the object having an association with the first object by moving the object having an association with the first object to a certain height and then lowering it back to its original position. Definitely, there may also be other implementation manners, which are not limited in the embodiment of the present invention.

Figure 2B:
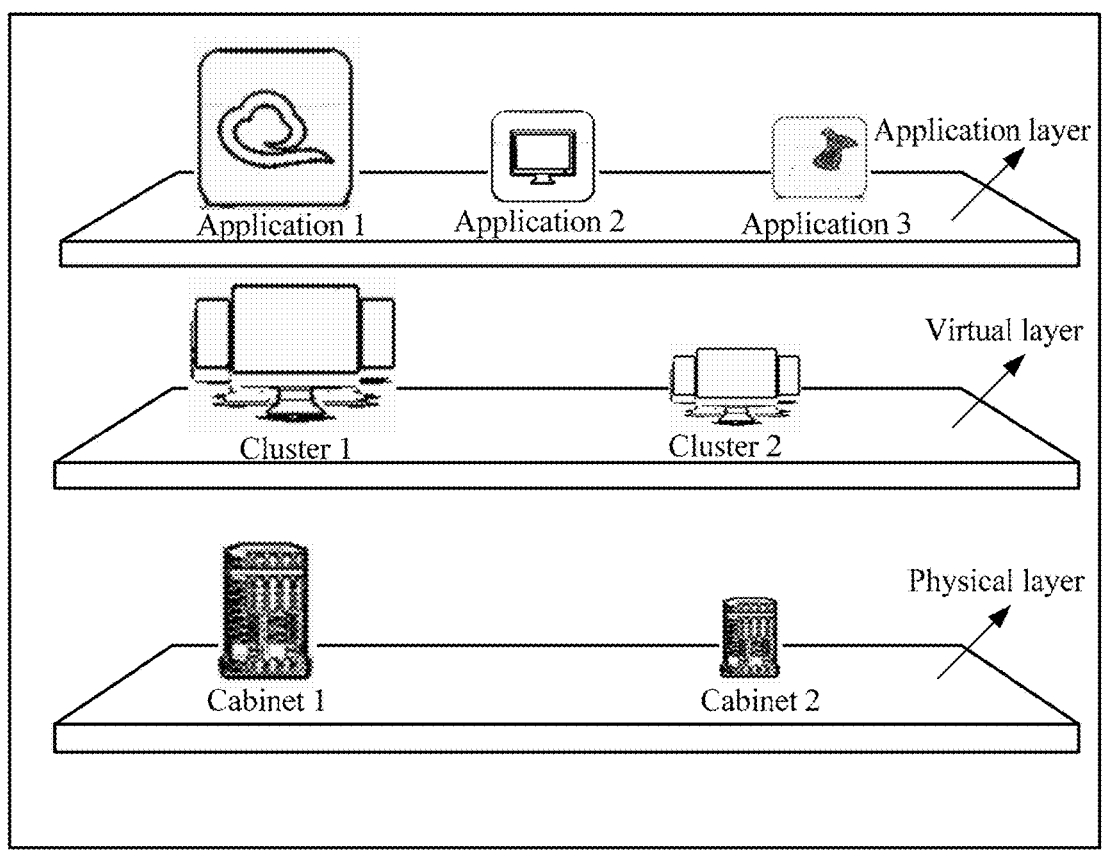

For example, as shown in FIG. 2b, the first object is application 1, and objects having associations with the first object are cluster 1 and cabinet 1. In this case, other objects may be dimmed to prominently present application 1 and prominently present cluster 1 and cabinet 1. If objects having associations with application 1 are some virtual machines in cluster 1, the mobile terminal may directly expand and present the virtual machines in cluster 1 that have associations with application 1. Definitely, if objects having associations with application 1 are some physical machines in cabinet 1, the mobile terminal may directly expand and present the physical machines in cabinet 1 that have associations with application 1.

In the embodiment of the present invention, the presenting a first object set on a display device in a hierarchical manner of an application layer, a virtual layer, and a physical layer in S110 includes:

presenting the first object set in a manner where an upper layer, an intermediate layer, and a lower layer are isolated from each other in space, where the application layer is at the upper layer, the virtual layer is at the intermediate layer, the physical layer is at the lower layer, and a virtual tray is formed at the bottom of each layer to serve as a reference for object arrangement at the layer.

Definitely, in the embodiment of the present invention, the first object set may also be presented in other arrangement manners. For example, first objects may be divided into left, middle, and right layers that are isolated from each other in space.

In the embodiment of the present invention, the virtual tray may further present a prompt, and the prompt may be used to indicate whether there is an unpresented object at a layer borne by the virtual tray.

Figure 3:
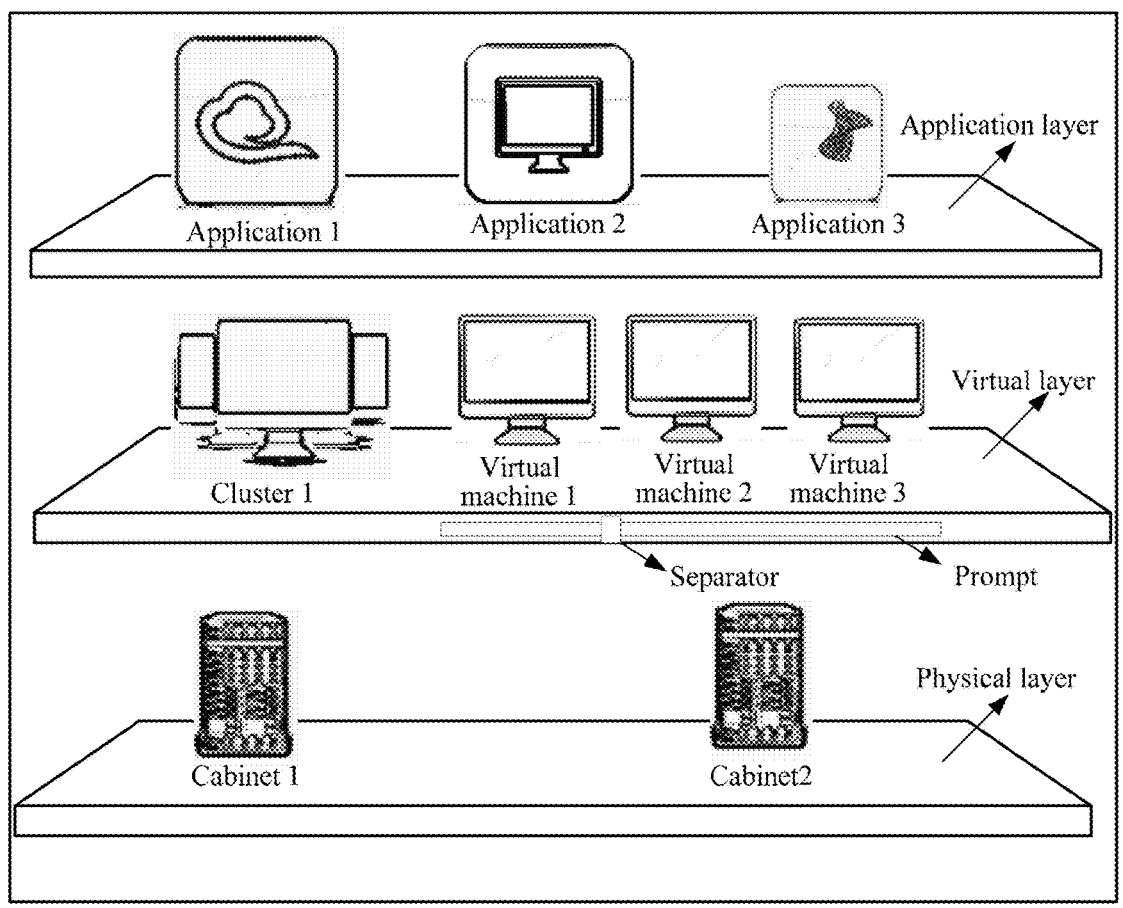
FIG. 3 is a schematic diagram of resource displaying according to another embodiment of the present invention.

For example, as shown in FIG. 3, a prompt for cluster 2 exists under virtual machine 1, virtual machine 2, and virtual machine 3 at the virtual layer. This prompt indicates that not all virtual machines included in cluster 2 are presented. In addition, there is a separator on the prompt, and the separator is used to indicate a ratio of unpresented virtual machines to presented virtual machines in cluster 2.

In the embodiment of the present invention, the presenting a first object set on a display device in a hierarchical manner of an application layer, a virtual layer, and a physical layer in S110 includes:

according to a fault level of a faulty object at a same layer in the first object set, arranging and presenting, in an area to which the same layer belongs on the display device, objects at the same layer.

Specifically, when objects at a same layer have different fault levels, according to a fault level of each object, the mobile terminal may arrange and present, in an area to which the same layer belongs, the objects at the same layer. For example, an object with a high fault level may be arranged in front; if there are multiple objects at a same fault level, the multiple objects having the same fault level may be arranged in order of initials of names (or Pinyin of names, wherein "Pinyin" is a phonetic spelling of transcribing the sound of Chinese characters into Latin script) of the objects. Further, different fault levels may have different visual elements, where the visual elements may include at least one of color, geometry, and size. For example, as shown in FIG. 3, application 1 and application 2 at the presented application layer are of a same size and in front. It can be learned that application 1 and application 2 have a same fault level. In addition, application 3 is in back and of a smaller size. It may be learned that a fault level of application 3 is lower than that of application 1 and application 2. In this way, states of network objects can be clearly displayed to a user by arranging the objects according to fault levels and/or assigning different visual elements to different fault levels, so that the user may maintain a network better.

In the embodiment of the present invention, the first object set includes a second object, and the second object is a superior object of the first object. In this case, the presenting a first object set on a display device in a hierarchical manner of an application layer, a virtual layer, and a physical layer includes:

when the display device presents the second object, presenting, based on input for the second object, a subordinate object included in the second object in an area to which a layer of the second object belongs; and when the presented subordinate object included in the second object excludes the first object, and the area to which the layer of the second object belongs presents a prompt indicating that not all subordinate objects included in the second object are presented, presenting, in a scroll manner and based on input for the area to which the layer of the second object belongs, a subordinate object that is not presented and is included in the second object in the area to which the layer of the second object belongs, until the first object is presented on the display device.

Before the presenting a subordinate object included in the second object in an area to which a layer of the second object belongs, the presenting a first object set on a display device in a hierarchical manner of an application layer, a virtual layer, and a physical layer includes:

When the display device presents a peer object of the second object instead of presenting the second object, and the area to which the layer of the second object belongs presents a prompt indicating that not all subordinate objects included in a superior object of the second object are presented, presenting, in a scroll manner and based on input for the area to which the layer of the second object belongs, a subordinate object that is not presented and is included in the superior object of the second object in the area to which the layer of the second object belongs, until the second object is presented on the display device.

Specifically, the mobile terminal may present a related object of cloud-computing to a user in response to input of the user. However, if the display device does not present a first object that the user needs to learn and also does not present a superior object (that is, a second object) of the first object, input may be performed in an area to which a layer of the superior object of the first object belongs. Then, the mobile terminal may present, in a scroll manner and according to the input of the user, a peer object of the superior object of the first object in the area to which the layer of the superior object of the first object belongs, until the superior object (that is, the second object) of the first object is presented. The user may perform input for the second object. After detecting an input signal for the second object, the mobile terminal may present subordinate objects included in the second object in the area to which the layer of the second object belongs. However, due to its limited area of the display device, the mobile terminal may display only some subordinate objects included in the superior object of the first object and present a prompt used to indicate that not all subordinate objects included in the superior object of the first object are presented. Then, when viewing the prompt instead of the first object on the display device of the mobile terminal, the user learns that the display device cannot display all subordinate objects included in the superior object of the first object because there are a relatively large number of objects. In this case, the user may perform input for an area to which a layer of the first object belongs, for example, the user slides a finger on the display device in a direction of object arrangement. Then, the mobile terminal may present, in a scroll manner and according to the input of the user, objects that are not presented and belong to the same superior object as the first object in the area to which the layer of the first object belongs, until the first object is presented on the display device. The user may click the first object, and the mobile terminal may prominently present an object having an association with the first object after detecting an input signal of the user for the first object. Definitely, the first object may also be prominently presented at the same time.

In the embodiment of the present invention, if the first object is a virtual machine, a peer object of the first object is another virtual machine, the superior object of the first object is a cluster, a peer object of the superior object of the first object is another cluster, and a subordinate object of the superior object of the first object is a virtual machine included in the cluster; if the first object is a physical machine, for example, a board, a memory, or a server, a peer object of the first object is another physical machine, the superior object of the first object is a cabinet, a peer object of the superior object of the first object is another cabinet, and a subordinate object of the superior object of the first object is a physical machine included in the cabinet.

Figure 4A:
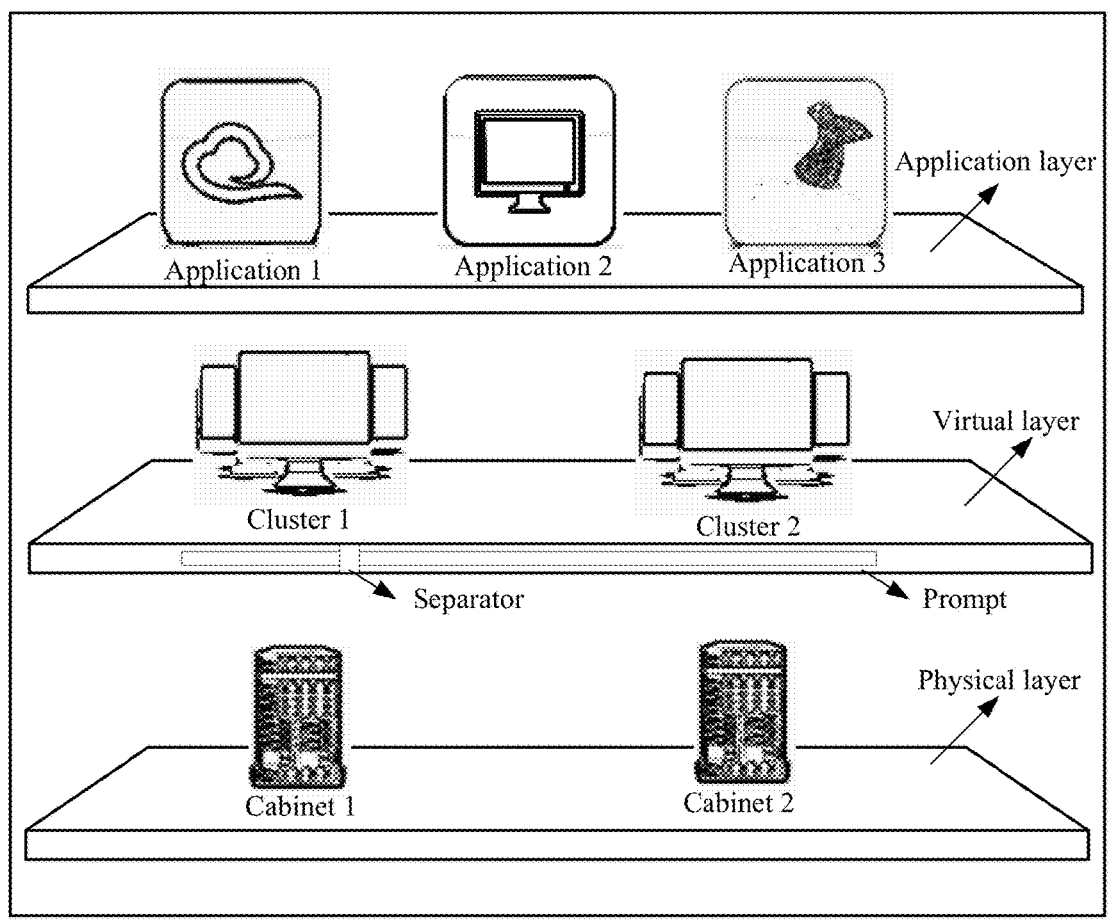
FIG. 4a to FIG. 4d are schematic diagrams of resource displaying according to another embodiment of the present invention.
Figure 4B:
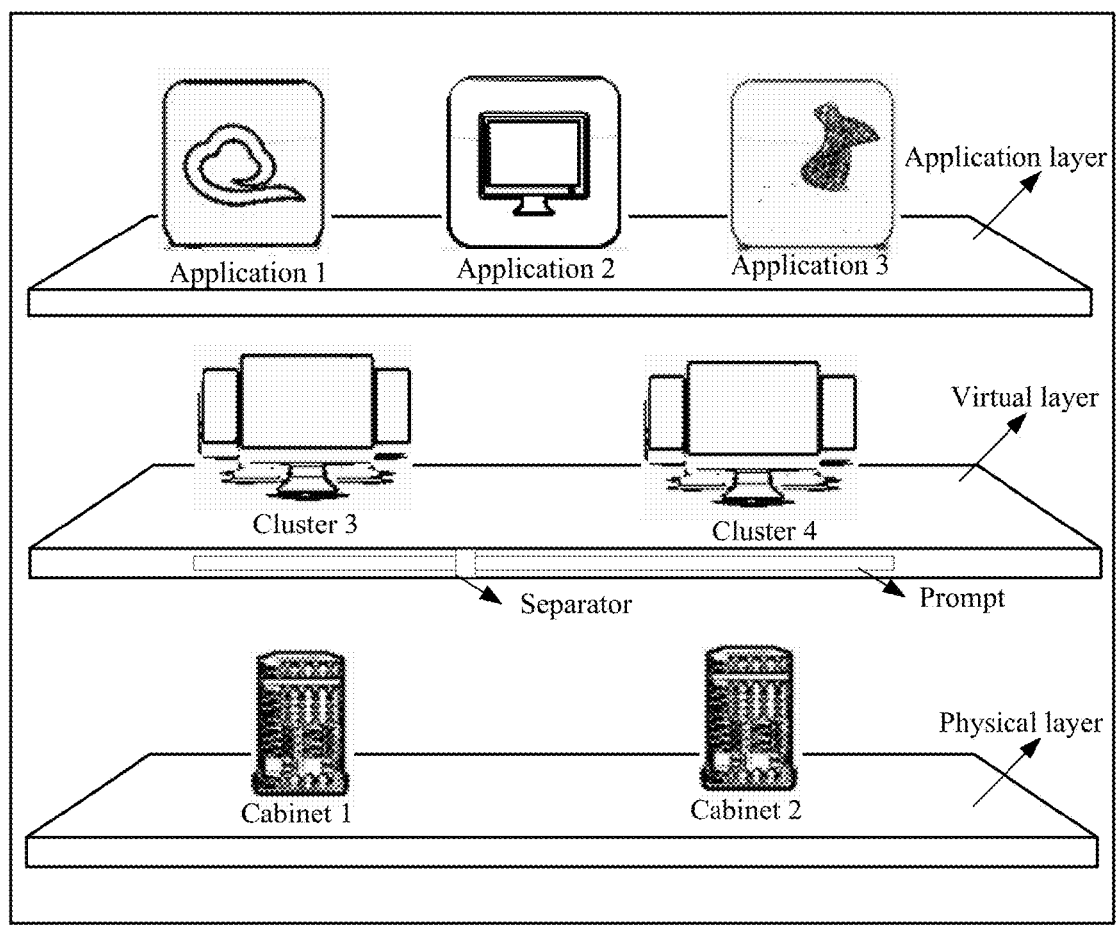
Figure 4C:
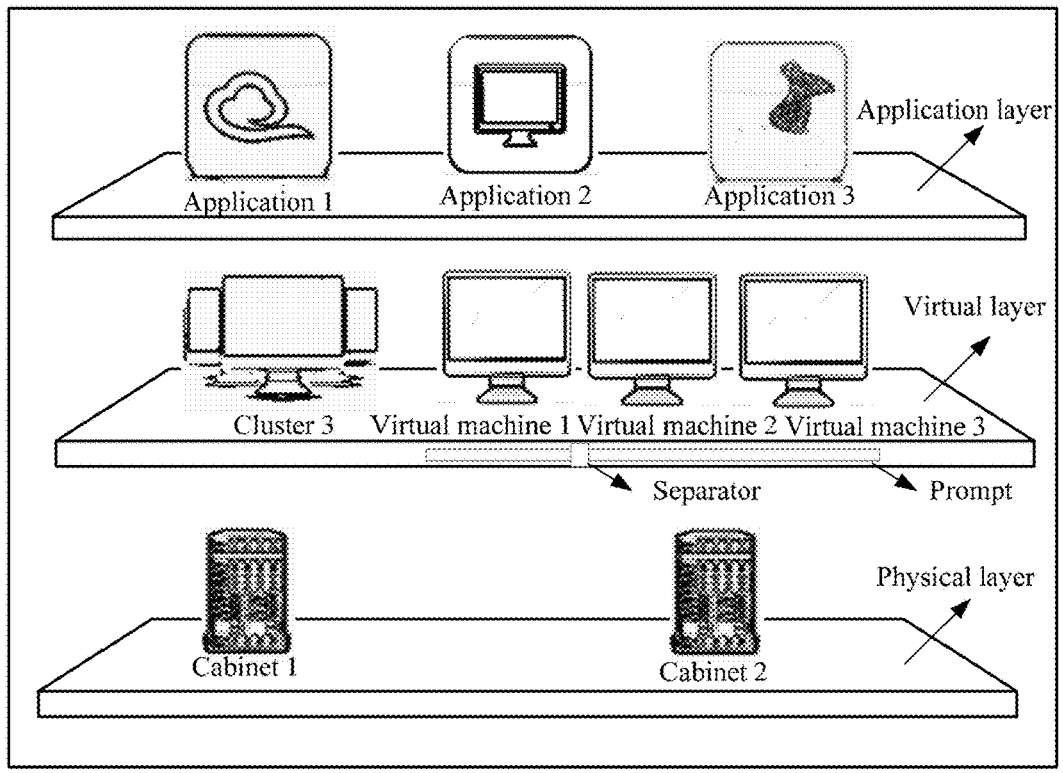
Figure 4D:
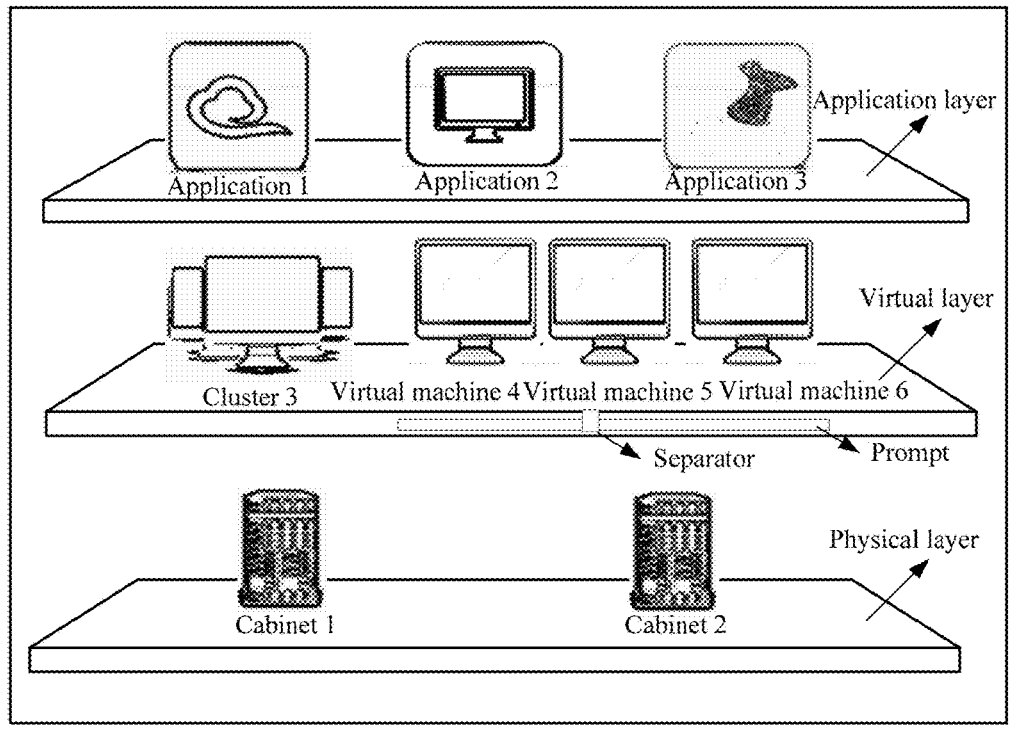

For example, as shown in FIG. 4a, a display device presents application 1, application 2, application 3, cluster 1, cluster 2, cabinet 1, and cabinet 2. Virtual machine 5 (that is, a first object) belongs to cluster 4 (a superior object of the first object), a prompt exists on a virtual tray at the bottom of the virtual layer to indicate that not all clusters included at the application layer are prompted. In this case, a user may slide a finger in an area to which the virtual layer belongs, and after detecting an input signal of the user, a mobile terminal may present, in a scroll manner, other clusters that are not presented at the virtual layer, until cluster 4 is presented, as shown in FIG. 4b. Then, the user may click cluster 4. The mobile terminal presents, on its display device according to the click input of the user, virtual machine 1, virtual machine 2, and virtual machine 3 that are included in cluster 4. Due to a limited display area, not all virtual machines included in cluster 4 are presented. In this case, a prompt may be presented on the virtual tray bearing the virtual layer, so as to indicate that not all virtual machines included in cluster 4 are presented. The prompt may include a separator, where the separator may indicate a relationship between the number of objects presented and the number of unpresented objects, as shown in FIG. 4c. The user needs to view an object having an association with virtual machine 5 that belongs to cluster 4, but virtual machine 5 is not displayed and only virtual machine 1, virtual machine 2, and virtual machine 3 (peer objects that belong to the same superior object as virtual machine 5) in cluster 4 (the superior object of virtual machine 5) are displayed. Therefore, the user may slide a finger in an area where the virtual layer is located, for example, sliding left. In this way, the mobile terminal may present virtual machines included in cluster 4 in a scroll manner until virtual machine 5 is presented, as shown in FIG. 4d. Then, the user may perform click input on virtual machine 5, and the mobile terminal may prominently present an object having an association with virtual machine 5 after detecting an input signal for virtual machine 5.

Figure 5:
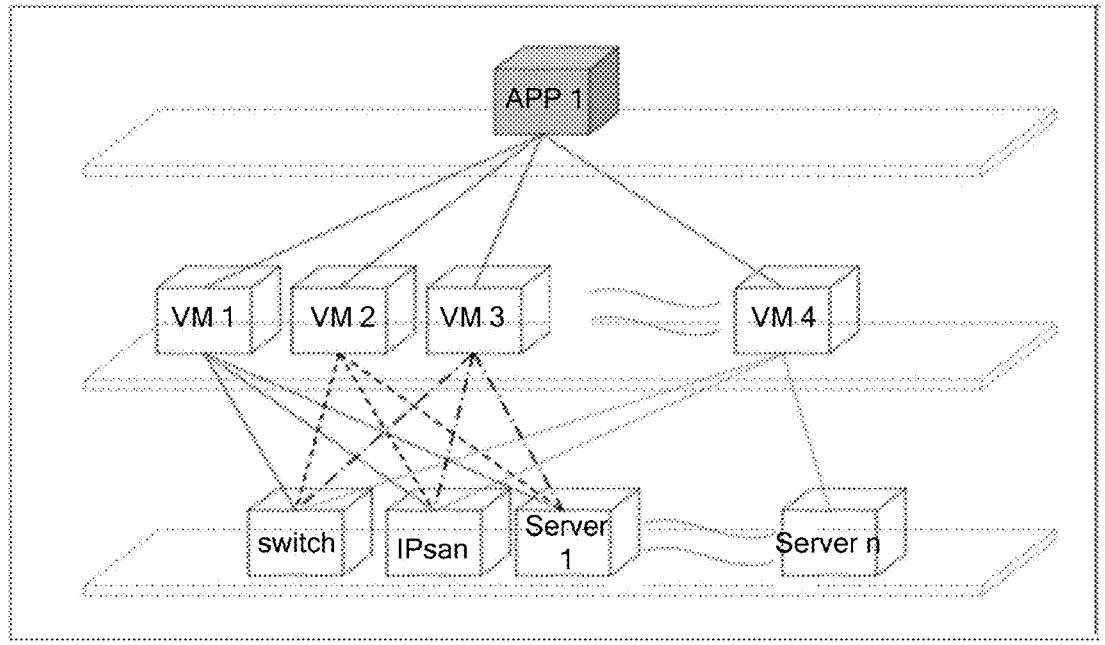
FIG. 5 is a diagram of associations between objects according to an embodiment of the present invention.

In the embodiment of the present invention, when the first object is an application, the object having an association with the first object may includes a virtual resource corresponding to the first object and a physical resource that corresponds to the virtual resource corresponding to the first object. For example, as shown in FIG. 5, when the first object is application 1 (App 1), objects having associations with App 1 are virtual machine (Virtual Machine, "VM" for short) 1, VM 2, VM 3, VM n, and a switch (switch), an Ipsan (memory), and Server (server) 1 that correspond to VM 1, VM 2, and VM 3, and Server n that corresponds to VM n other than the switch and the Ipsan. In this case, after a user selects App 1, the mobile terminal may determine, for the selection input of the user, that objects having associations with the APP 1 are VM 1, VM 2, VM 3, VM n, the switch, the Ipsan, Server 1, and Server n according to associations between objects shown in FIG. 5. Then, the mobile terminal may prominently present these objects having associations with App1 to the user.

Figure 6:
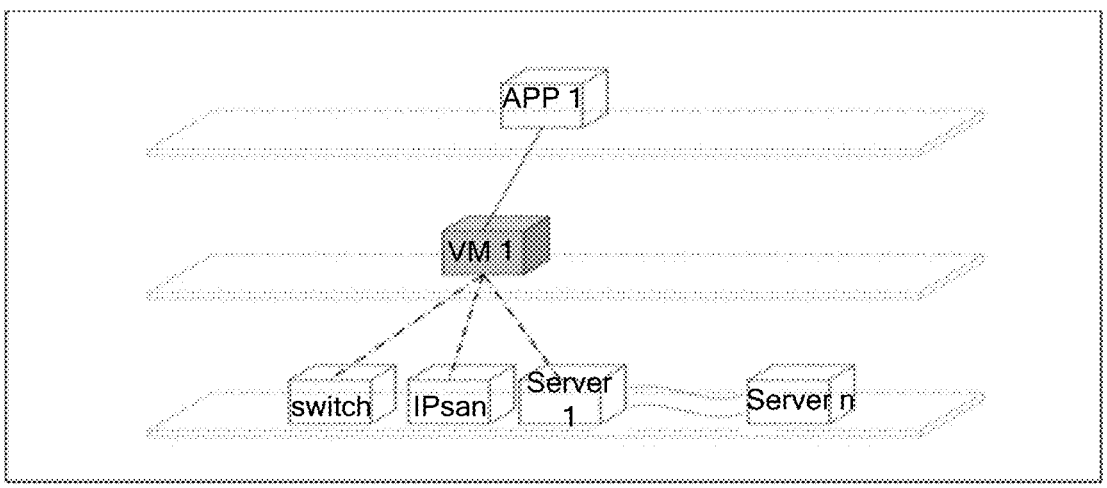
FIG. 6 is a diagram of associations between objects according to another embodiment of the present invention.

When the first object is a virtual resource, the object having an association with the first object may include an application corresponding to the first object and a physical resource corresponding to the first object. For example, as shown in FIG. 6, when the first object is VM 1, objects having associations with VM 1 are App1, a switch, an Ipsan, and Server 1. In this case, after a user selects VM 1, the mobile terminal may determine, for the selection input of the user, that objects having associations with VM1 are App1, the switch, the Ipsan, and Server 1 according to associations between objects shown in FIG. 6. Then, the mobile terminal may prominently present these objects having associations with the first object to the user. In the embodiment of the present invention, if the first object is a virtual resource, the objects having associations with the first object may include not only an application corresponding to the first object and a physical resource corresponding to the first object but also other virtual resources having associations with the first object.

When the first object is a physical resource, the object having an association with the first object may include a virtual resource corresponding to the first object and an application that corresponds to the virtual resource corresponding to the first object. For example, as shown in FIG.

Figure 7:
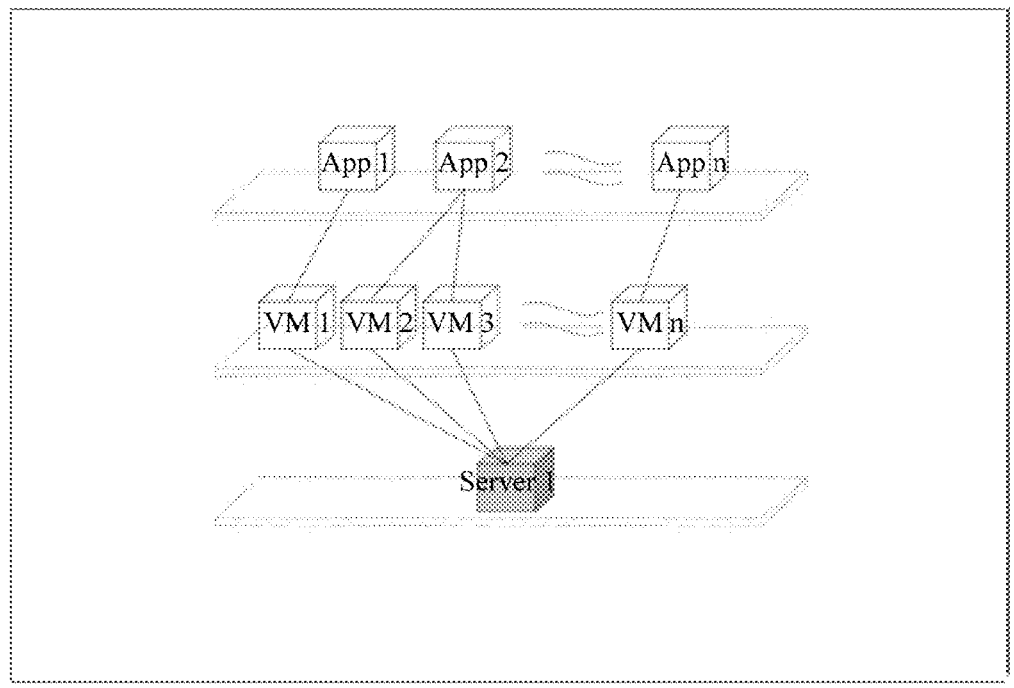
FIG. 7 is a diagram of associations between objects according to another embodiment of the present invention.

7, when the first object is Server 1, objects having associations with Server 1 are VM 1, VM 2, VM 3, VM n, App1 associated with VM 1, APP 2 associated with VM 2 and VM 3, and App n associated with VM n. In this case, after a user selects Server 1, the mobile terminal may determine, for the selection input of the user, that objects having associations with server1 are VM 1, VM 2, VM 3, VM n, App 1, App 2 and App n according to associations between objects shown in FIG. 7. Then, the mobile terminal may prominently present these objects having associations with Server 1 to the user. In the embodiment of the present invention, when the first object is a physical resource, the objects having associations with the first object may include not only a virtual resource corresponding to the first object and an application that corresponds to the virtual resource corresponding to the first object but also other physical resources having associations with the first object.

In the embodiment of the present invention, a physical resource may be a physical device such as a cabinet, a board, a server, a switch, or a memory; a virtual resource may be a cluster of virtual machines or a virtual machine.

In the embodiment of the present invention, the prominently presenting an object having an association with the first object that belongs to the first object set in S120 may include:

prominently presenting, on the display device, the object having an association with the first object, where the object having an association with the first object includes a third object; and prominently presenting, based on input for the third object, an object having an association with the first object among subordinate objects of the third object in the area to which the layer of the third object belongs.

Figure 8A:
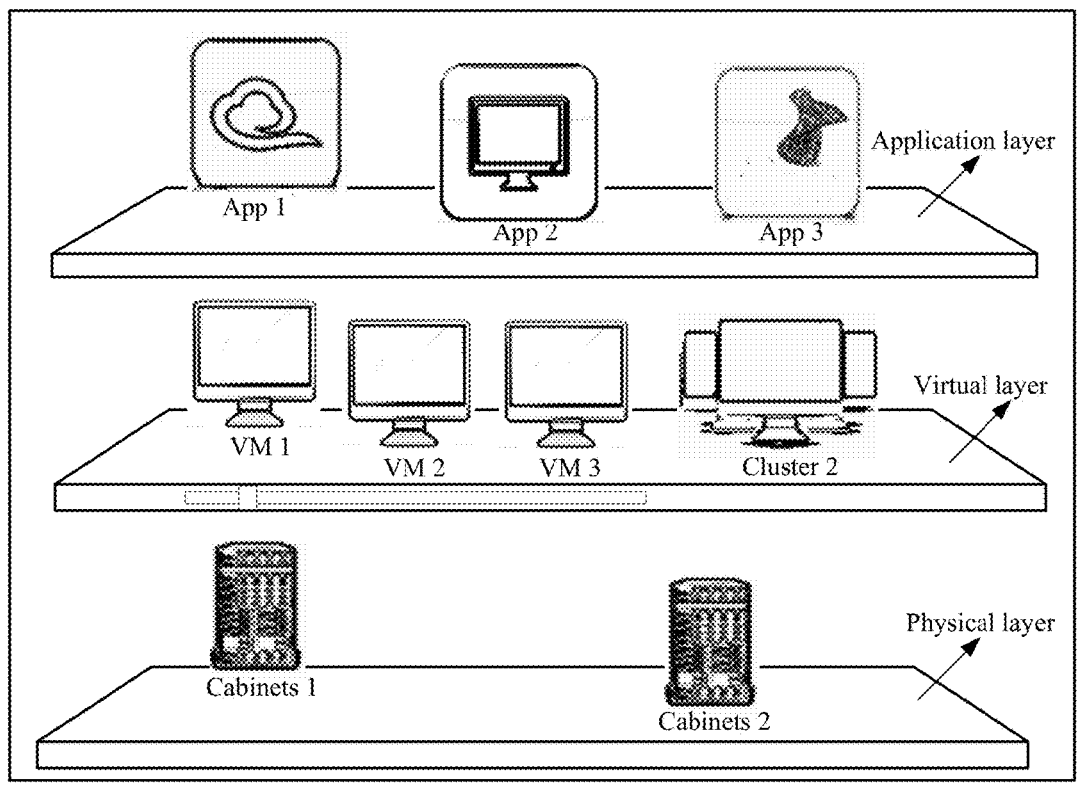
FIG. 8a to FIG. 8b are schematic diagrams of resource displaying according to another embodiment of the present invention.
Figure 8B:
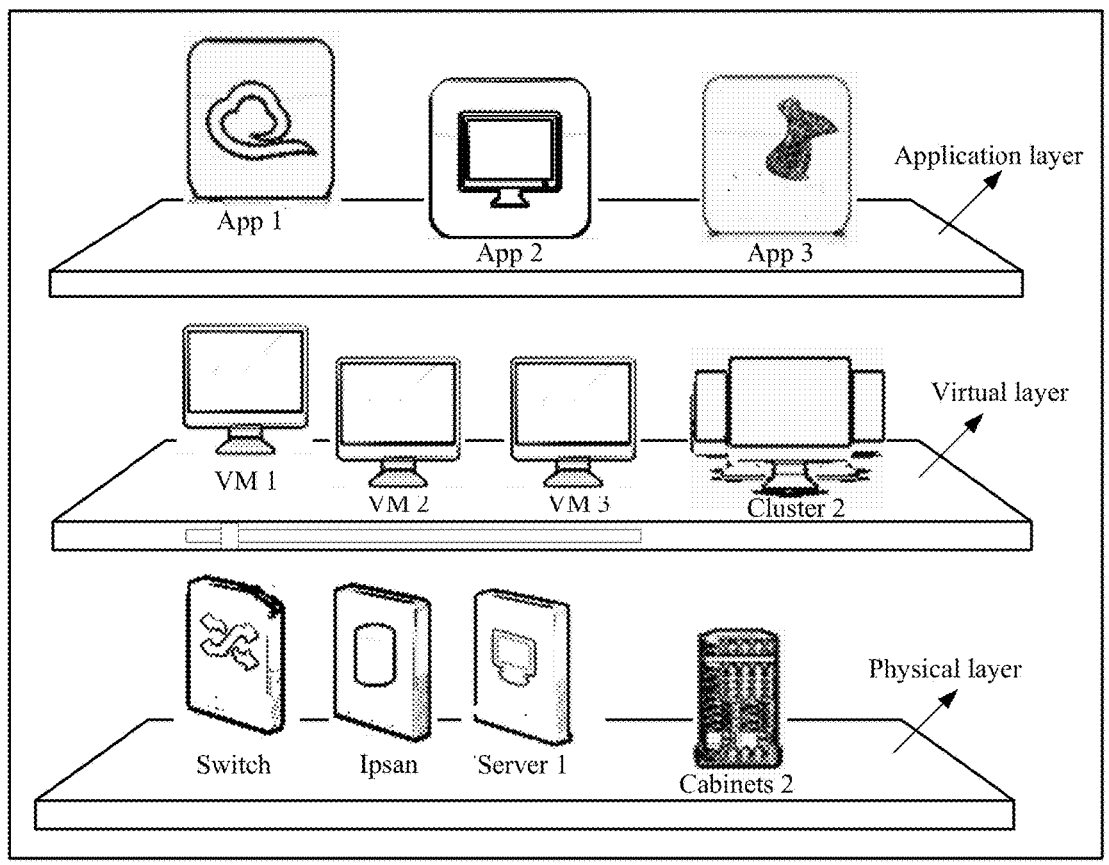

The associations shown in FIG. 6 are taken as an example. The first object is VM 1, and objects having associations with the first object are App1, the Switch, the Ipsan, and Server 1, where the Switch, the Ipsan, and Server 1 are housed in cabinet 1 (Cabinets 1). After a user selects VM 1, the mobile terminal may determine, based on the selection input of the user, that objects associated with the server1 are the Switch, the Ipsan, and Server 1 in cabinet 1. The mobile terminal may prominently display cabinet 1 because cabinet 1 is not expanded for play, as shown in FIG. 8a. If specific physical devices in the cabinet that have associations with VM1 need to be viewed, the user may click cabinet 1. Then, the mobile terminal may prominently present, for the click input of the user, the objects in the cabinet that have associations with object 1, that is, the Switch, the Ipsan, and Server 1. Definitely, after the user selecting VM 1, the mobile terminal may directly expand and prominently present, based on the input of the user, the objects in cabinet 1 that have associations with APP 1, that is, the switch, the Ipsan, and Server 1, as shown in FIG. 8b.

In the embodiment of the present invention, an association refers to a relationship between objects in an operation and implementation process, for example, a resource providing relationship between objects in an operation and implementation process, or a mutual impact relationship between objects in an operation and implementation process.

In the embodiment of the present invention, an object having an association with a first object refers to an object that provides a required implementation resource for operation and implementation of the first object during the operation and implementation, and/or an object for which the first object can provide an implementation resource, and/or an object affected by the operation and implementation of the first object, and/or an object whose operation and implementation can be affected by the first object.

Therefore, in the embodiment of the present invention, a first object set is presented on a display device in a hierarchical manner of an application layer, a virtual layer, and a physical layer, and based on input for a first object, an object having an association with the first object is prominently presented on the display device, so that logical connection relationships between objects on a cloud computing network can be clearly displayed to a user. In this way, when a fault occurs on the cloud computing network, the user can quickly locate a fault source and a related object, thereby improving efficiency of handling a cloud fault for the user.

Figure 9:
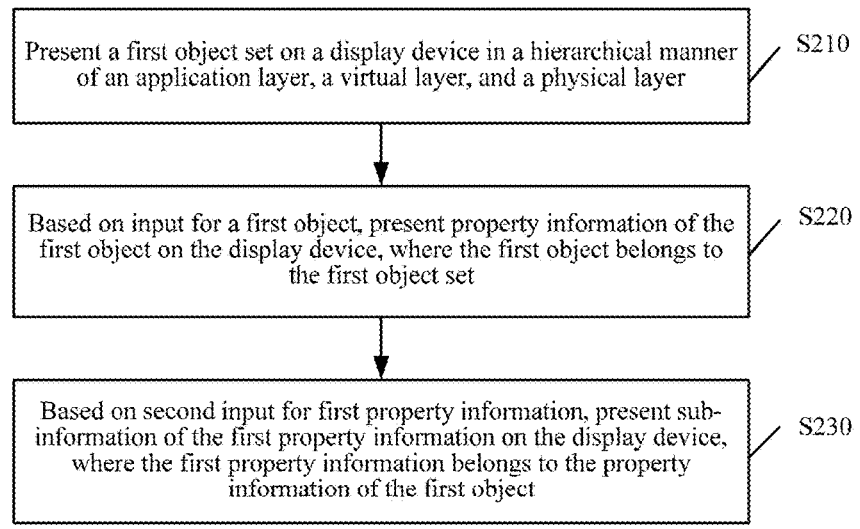
FIG. 9 is a schematic flowchart of a method for displaying resource information according to another embodiment of the present invention.

FIG. 9 is a schematic block diagram of a method 200 for displaying resource information. As shown in FIG. 9, the method 200 includes:

S210. Present a first object set on a display device in a hierarchical manner of an application layer, a virtual layer, and a physical layer.

S220. Based on input for the first object, present property information of a first object on the display device, where the first object belongs to the first object set.

S230. Based on input for first property information, present sub-information of the first property information on the display device, where the first property information belongs to the property information of the first object.

Figure 10A:
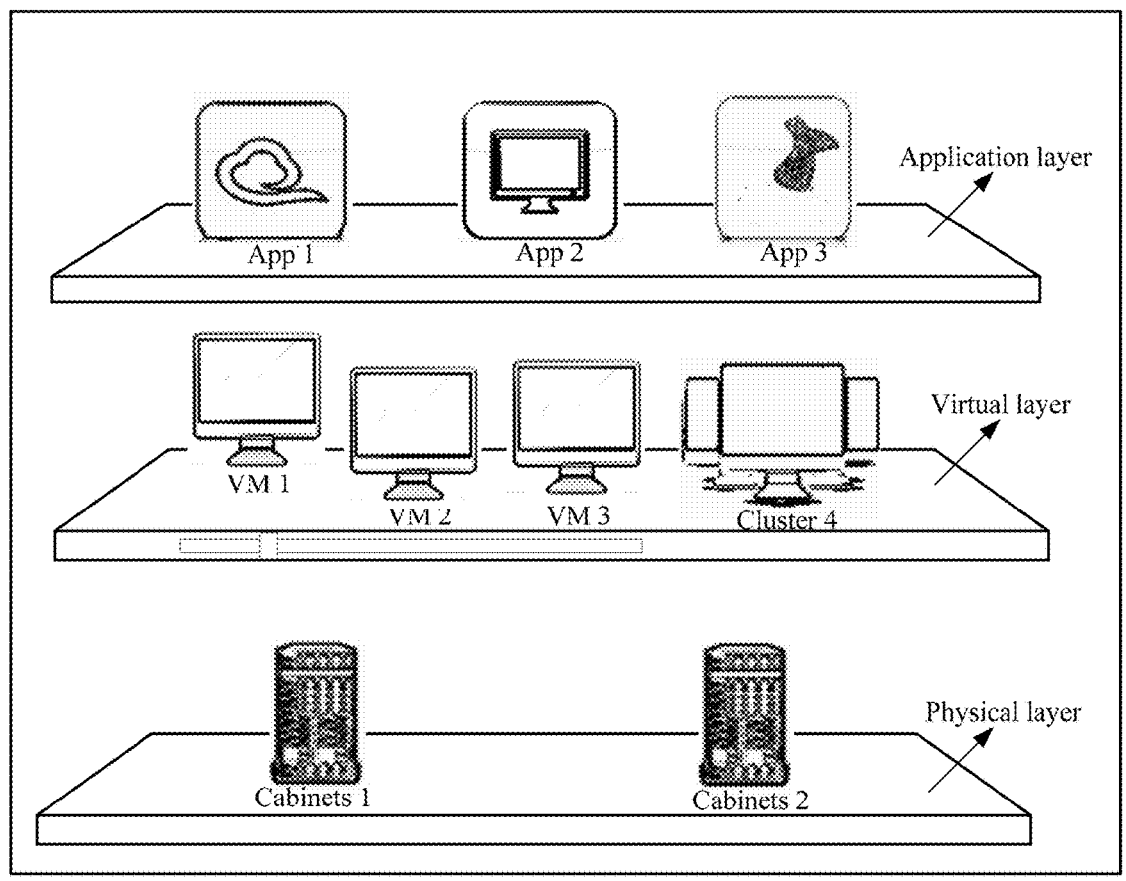
FIG. 10a to FIG. 10c are schematic diagrams of resource displaying according to another embodiment of the present invention.
Figure 10B:
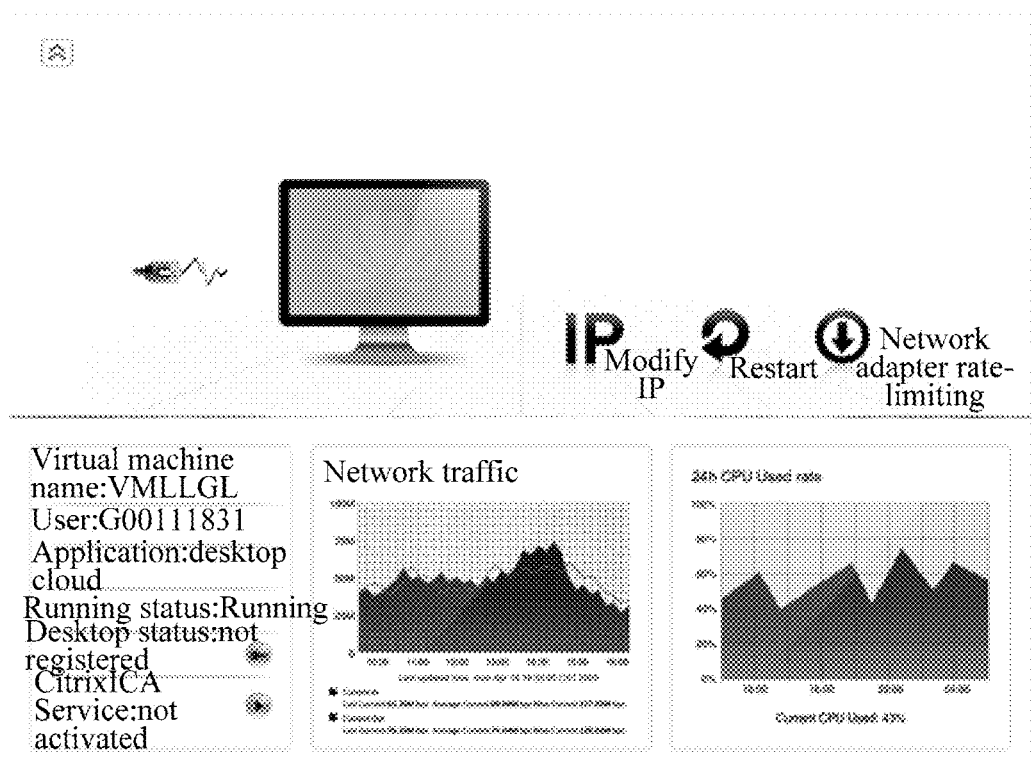

Specifically, as shown in FIG. 10a, a mobile terminal may present a first object set in a manner of an application layer, a virtual layer, and a physical layer on its display device. If a user needs to view property information of VM 1 in cluster (Cluster) 3, the user may click VM 1. Then, the mobile terminal may present the property information of the virtual machine on its display device according to the click input of the user, where the property information may be divided into an upper layer and a lower layer. The upper layer is visual expression of the virtual machine viewed currently, for example, a pattern of a computer; the lower layer may be detailed description about the upper layer, for example, as shown in FIG. 10b, may include basic information of the virtual machine, for example, information such as a name and a cluster to which the virtual machine belongs, and may further include running status information such as registration status and ICA service status of the virtual machine, network traffic of the virtual machine, resource consumption conditions of the current virtual processing unit (Virtual Processing Unit, "VCPU" for short), random access memory (random access memory, "RAM" for short), and storage of the virtual machine, and the like. Then, the user may acquire a specific piece of information of the object information blocks. The information helps the user determine an abnormality cause or status of the virtual machine and find a troubleshooting method. For example, in the method shown in FIG. 10c, the mobile terminal may present detailed information about the piece of information in a floating manner based on a view presenting the property information.

Therefore, in the embodiment of the present invention, a display device presents a first object set in a hierarchical manner of an application layer, a virtual layer, and a physical layer; based on input for a first object, property information of the first object is presented on the display device, where the first object belongs to the first object set; and based on input for first property information, sub-information of the first property information is presented on the display device, where the first property information belongs to the property information of the first object. In this way, a relatively large number of menus, ingresses, and frames on the display device can be reduced, and resource information on a cloud network can be clearly displayed to a user.

Figure 10C:
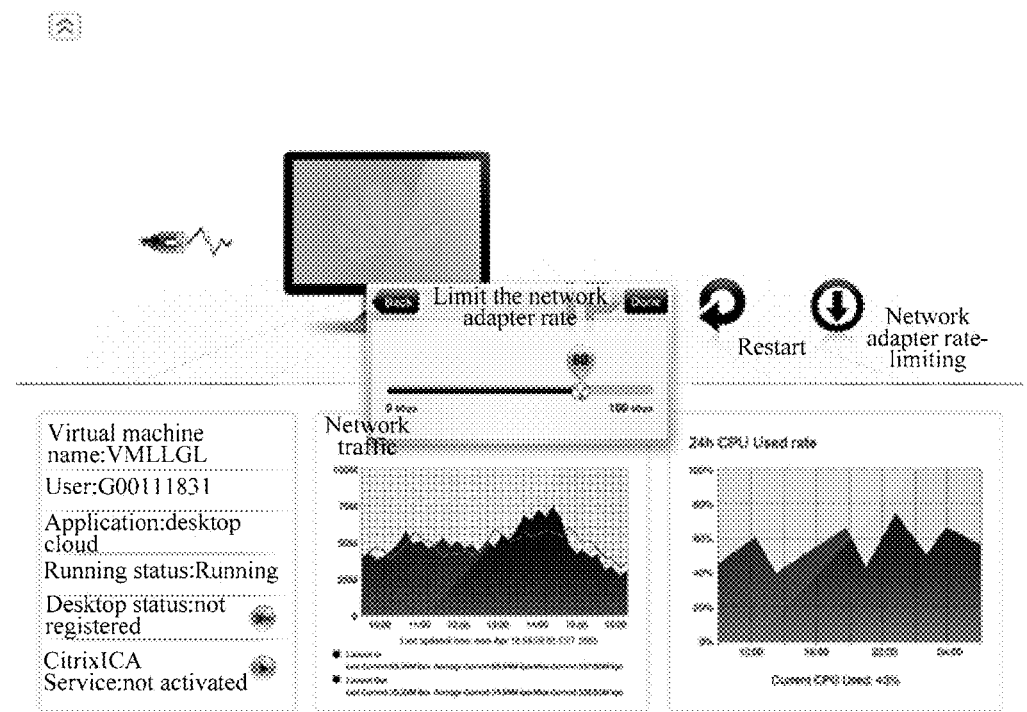
Figure 11:
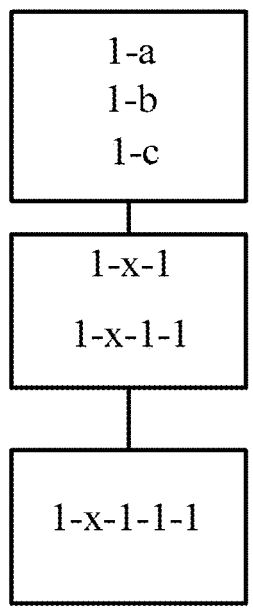
FIG. 11 is a diagram of topology relationships between views according to an embodiment of the present invention.

For ease of understanding, relationships between FIG. 10a, FIG. 10b, and FIG. 10c can be described according to a topology relationship shown in FIG. 11.

As shown in FIG. 11, a block including 1-a, 1-b, and 1-c represents a view presented in FIG. 10a, where 1-a represents the application layer, 1-b represents the virtual layer, and 1-c represents the physical layer; a block including 1-x-1 and 1-x-1-1 represents a view presented in FIG. 10b, where the 1-x-1 part represents visual expression of a virtual machine presented at the upper layer in FIG. 10b, and the 1-x-1-1 part represents lower-layer information in FIG. 10b, that is, detailed description for upper-layer information; and a block including 1-x-1-1-1 represents the dialog box presented in FIG. 10c. As can be seen from a topology relationship diagram in FIG. 11, in the method for displaying resource information 200 in the embodiment of the present invention, resource information on a cloud computing network can be clearly presented to a user.

In the embodiment of the present invention, the method 200 may further include:

based on input for selecting a layer, presenting, on the display device, a resource consumption condition of the layer.

Figure 12:
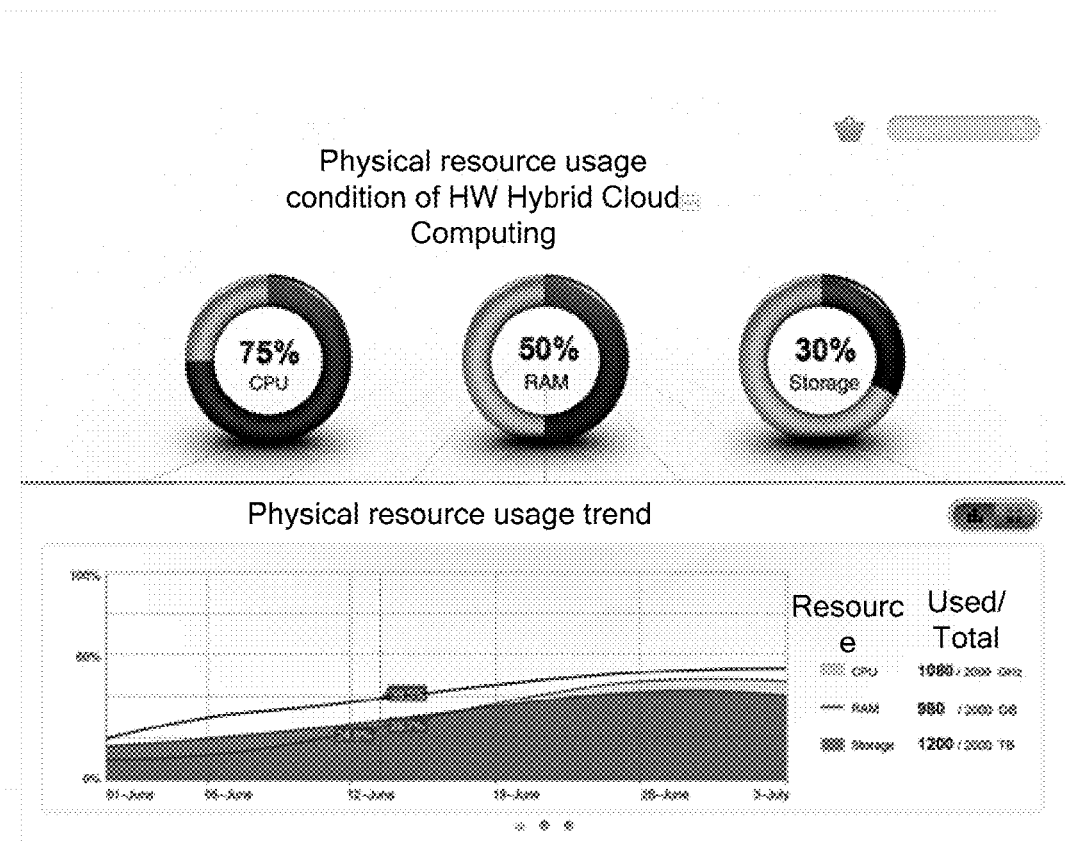
FIG. 12 is a schematic diagram of resource displaying according to another embodiment of the present invention.

For example, if a user selects the physical layer, information of a resource consumption condition of the physical layer shown in FIG. 10a may be presented. For example, as shown in FIG. 12, the upper part of the display device may present information most concerned by the user, such as a CPU used rate, a RAM used rate, and a storage device used rate, in a circle and/or a dashboard and/or a column graph; the lower layer may present sub-layer information concerned by the user. For example, for a whole of resources and a non-virtual desktop infrastructure (Virtual Desktop Infrastructure, "VDI" for short) cluster, the lower layer may display a resource consumption trend of the whole or the cluster, and may also present a specific consumption condition at a certain time point; for a VDI cluster, not only a consumption trend may be presented, but also the number of distributable virtual machines of different specifications in the remaining resources may be presented.

Figure 13A:
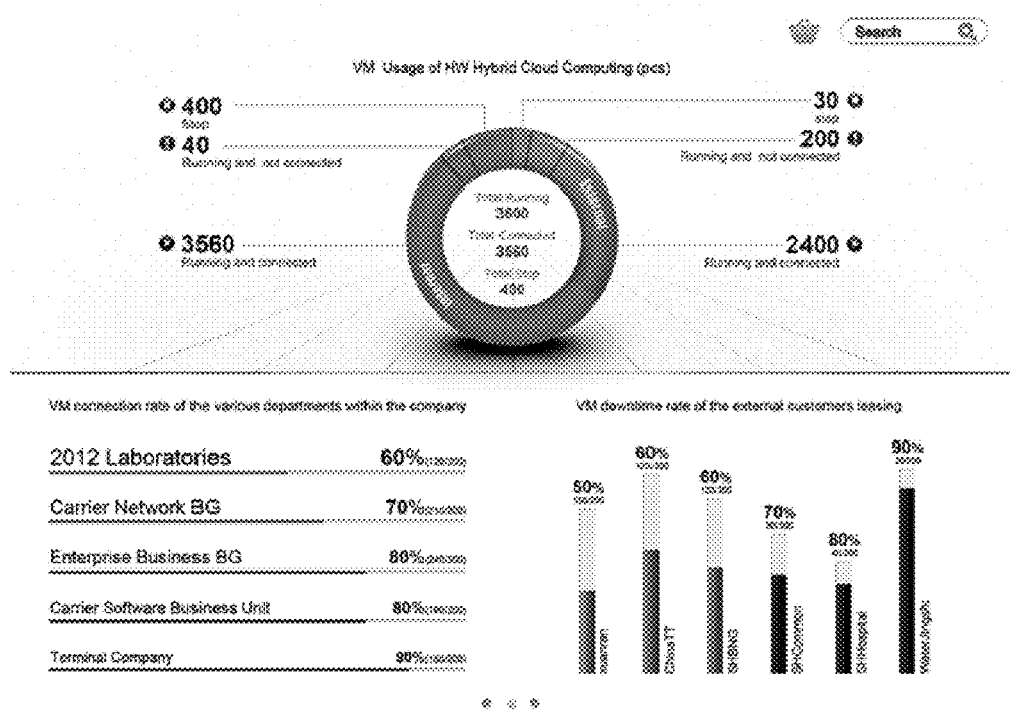
FIG. 13a and FIG. 13b are schematic diagrams of resource displaying according to another embodiment of the present invention.
Figure 13B:
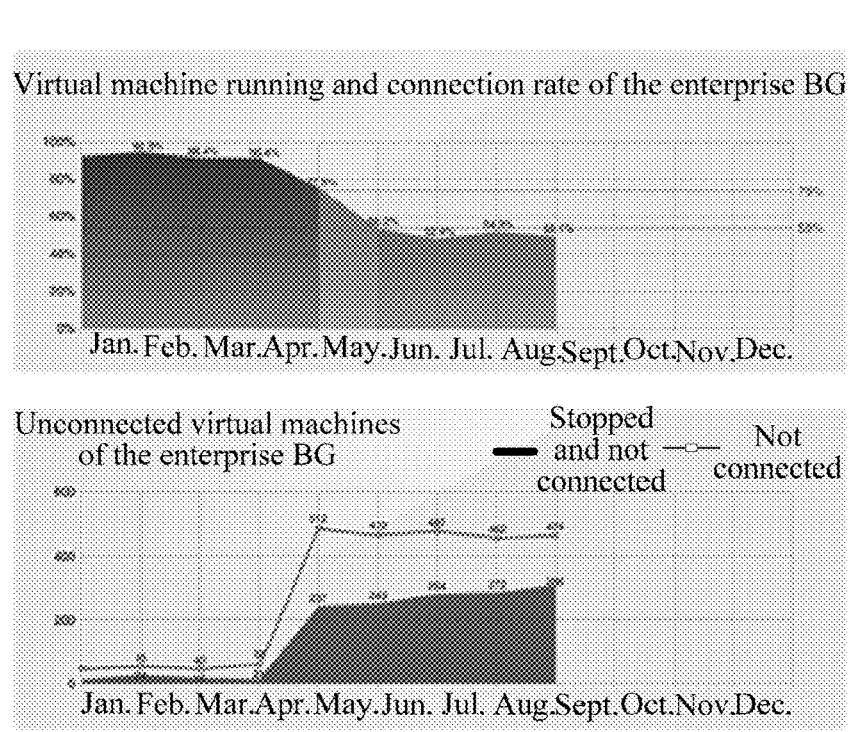

For example, if a user selects the virtual layer, a resource usage condition of the virtual layer may be presented. For example, as shown in FIG. 13a, statistics and computation of status information of virtual machines are presented, where the presented information may be divided into two layers. The upper layer presents statistics information, such as a running condition of a distributed VM (including an internal VM and/or external VM (a hybrid cloud situation involves an internal VM and an external VM, a private cloud situation involves only an internal VM, and a public cloud situation involves only an external VM) concerned by the user), for example, the number of stopped VMs, the number of unconnected running VMs (indicating that the VMs are running but not used), and the number of connected running VMs. The lower layer presents classification description for VM running statistics information at the upper layer. For example, running status of VMs of different internal departments is presented to help the user determine whether a certain department wastes a VM resource (a stopped VM or an unconnected running VM). If the user further needs to learn detailed information of a piece of lower-layer information, the user may click the information, and the mobile terminal may present the detailed information of the piece of lower-layer information according to the click input of the user. For example, it is viewed that connected running VMs of a certain internal department account for only 60%. In this case, the user may click the information to drill down to lower-layer information, and the mobile terminal may present the lower-layer information to the user, for example, a trend graph of a running and connection rate and a distribution trend graph of the number of stopped VMs and the number of unconnected running VMs, as shown in FIG. 13b.

Figure 14:
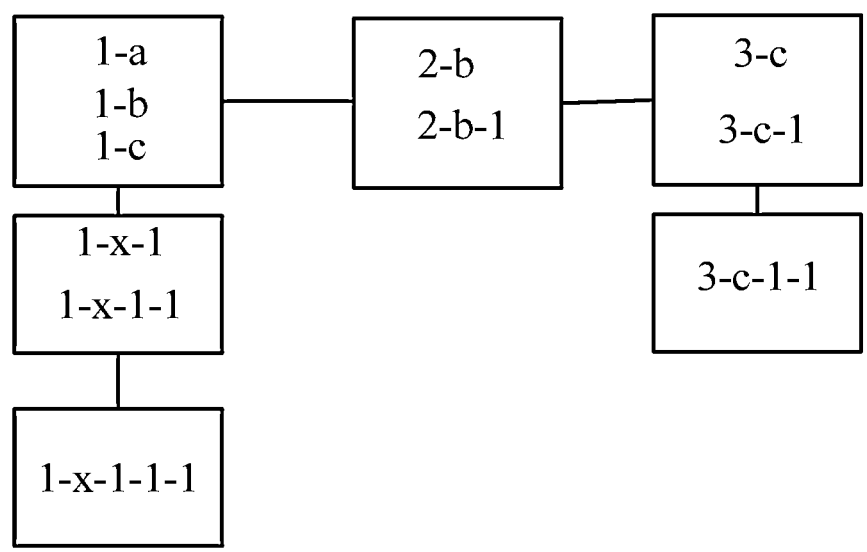
FIG. 14 is a diagram of topology relationships between views according to another embodiment of the present invention.

For clearer understanding of the present invention, the following describes a topology relationship diagram of FIG. 10a, FIG. 10b, FIG. 10c, FIG. 12, FIG. 13a, and FIG. 13b with reference to a topology relationship shown in FIG. 14.

As shown in FIG. 14, a block including 1-a, 1-b, and 1-c represents the view presented in FIG. 10a, where 1-a represents the application layer, 1-b represents the virtual layer, and 1-c represents the physical layer; a block including 1-x-1 and 1-x-1-1 represents the view presented in FIG. 10b, where the 1-x-1 part represents the visual expression of the virtual machine presented at the upper layer in FIG. 10b, and the 1-x-1-1 part represents lower-layer information in FIG. 10b, that is, detailed description for upper-layer information; and a block including 1-x-1-1-1 represents a dialog box presented in FIG. 10c. A block including 2-b and 2-b-1 represents a resource consumption condition of the physical layer in FIG. 12, where 2-b represents the upper layer in FIG. 12, which is the information most concerned by the user, that is, the CPU used rate, the RAM used rate, and the storage device used rate shown in the figure, and 2-b-1 represents the lower layer in FIG. 12, which is explanation and description of the upper layer. A block including 3-c and 3-c-1 represents FIG. 13a, where 3-c represents upper-layer information, that is, the statistics information shown in FIG. 13a, and 3-c-1 represents lower-layer information, which is detailed description for the upper-layer information. A block including 3-c-1-1 represents FIG. 13b, which is detailed description of a certain piece of information in 3-c-1. If information at each layer has different categories, the categories may be switched and implemented in a label classification manner. As can be seen from the topology relationship diagram in FIG. 14, in the method for displaying resource information 200 in the embodiment of the present invention, resource information on a cloud computing network can be clearly presented to a user.

Figure 15:
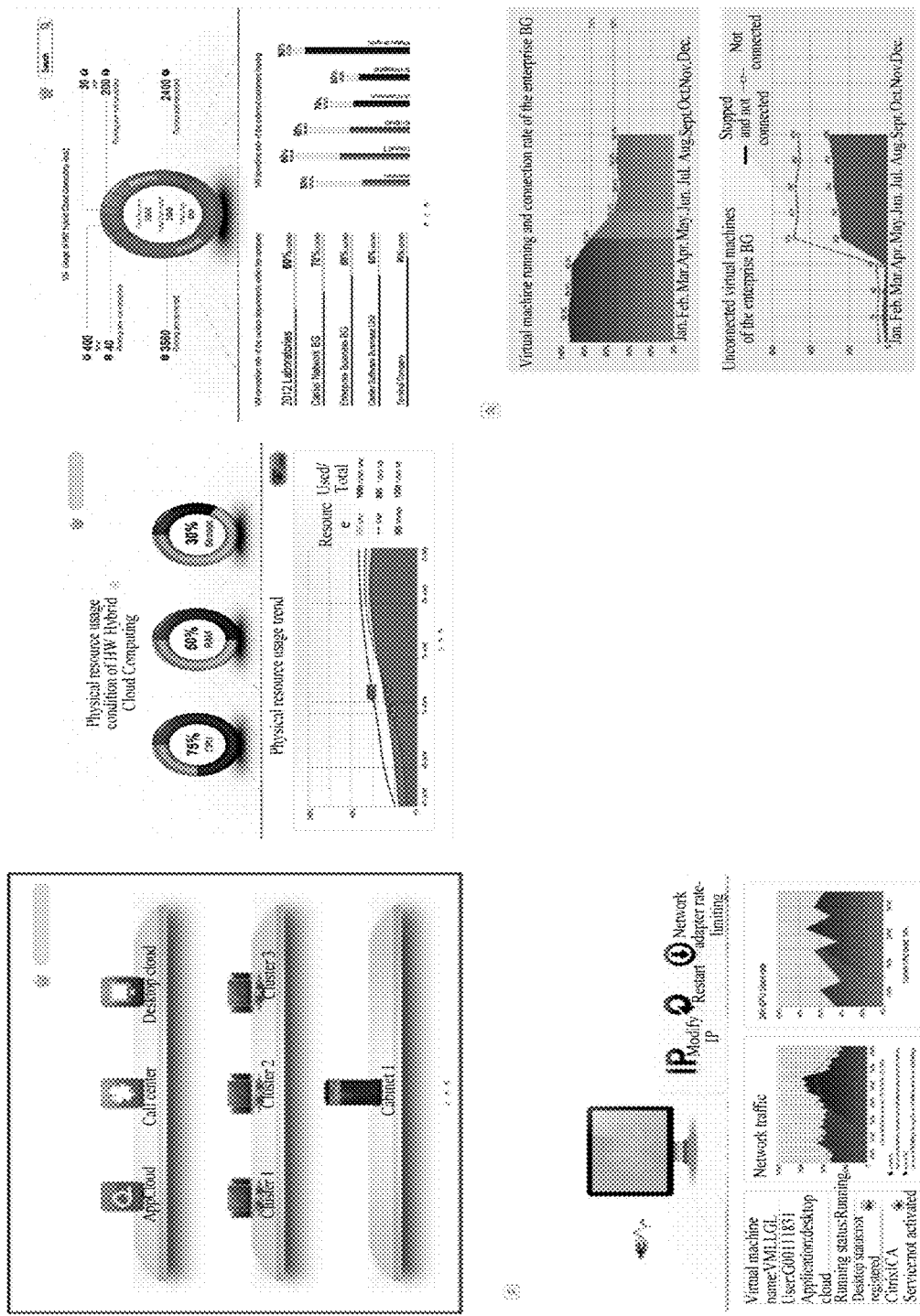
FIG. 15 is a schematic diagram of resource displaying according to another embodiment of the present invention.

In the embodiment of the present invention, a user may use a pinch and stretch manner. All presented views may be presented to the user in a thumbnail image manner, which may form the logic structure diagram in FIG. 11 or 14. In this way, the user can quickly switch views by clicking thumbnail images, for example, thumbnail images shown in FIG. 15.

Figure 16:
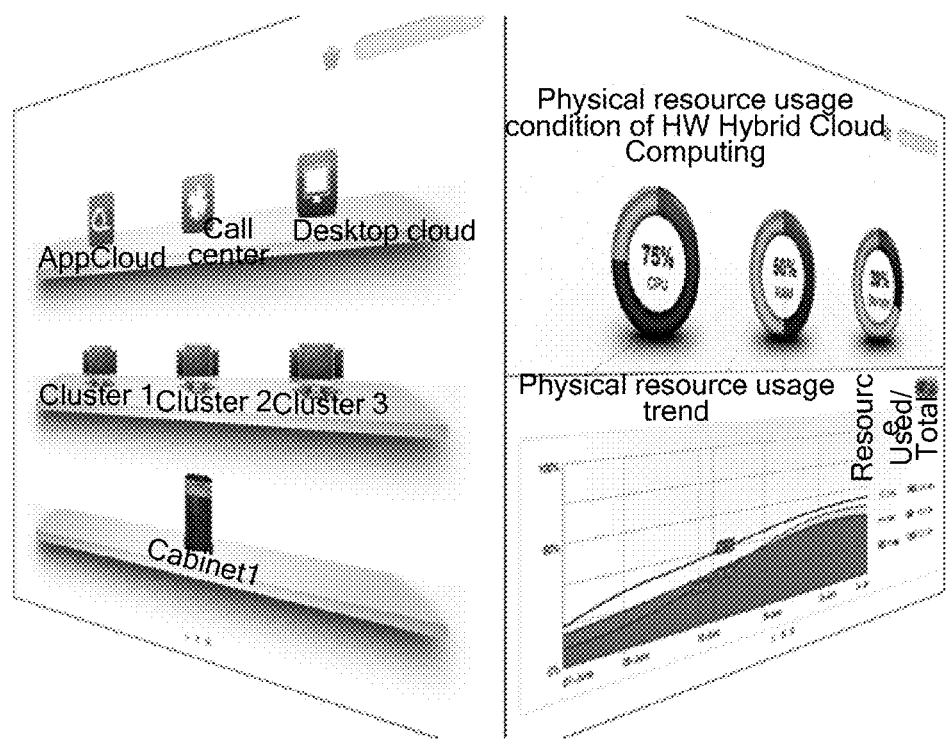
FIG. 16 is a schematic diagram of resource displaying according to another embodiment of the present invention.
Figure 17:
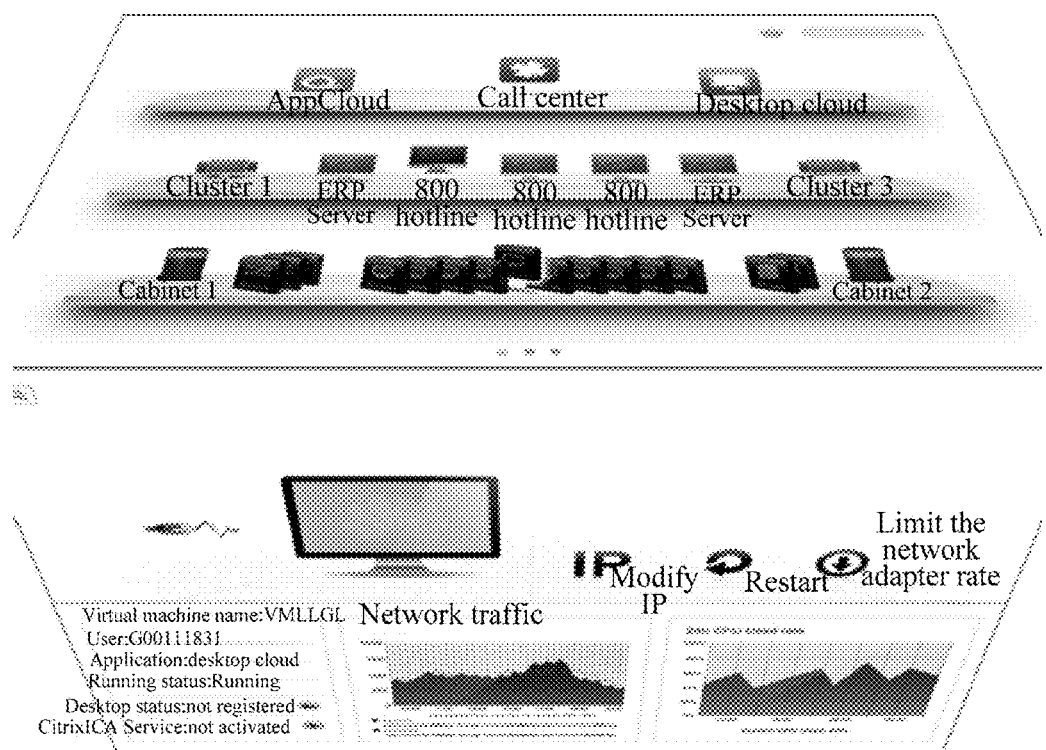
FIG. 17 is a schematic diagram of resource displaying according to another embodiment of the present invention.

In the embodiment of the present invention, when presenting switched information, the mobile terminal may switch presented information in a cube rotation manner. Views at the same level can be switched in a cube rotating left and right manner, as shown in FIG. 16. Views at different levels can be switched in a cube rotating up and down manner, as shown in FIG. 17. For example, FIG. 10, FIG. 12, and FIG. 13a are views at the same level and can be switched in the cube rotating left and right manner, while FIG. 10a, FIG. 10b, and FIG. 10c are views at different levels and can be switched in the cube rotating up and down manner.

In the embodiment of the present invention, the presenting a first object set on a display device in a hierarchical manner of an application layer, a virtual layer, and a physical layer in S110 includes:

presenting the first object set in a manner where an upper layer, an intermediate layer, and a lower layer are isolated from each other in space, where the application layer is at the upper layer, the virtual layer is at the intermediate layer, the physical layer is at the lower layer, and a virtual tray is formed at the bottom of each layer to serve as a reference for object arrangement at the layer.

Definitely, in the embodiment of the present invention, the first object set may also be presented in other arrangement manners. For example, first objects may be divided into left, middle, and right layers that are isolated from each other in space.

In the embodiment of the present invention, the virtual tray may further present a prompt, and the prompt may be used to indicate whether there is an unpresented object at a layer borne by the virtual tray.

For example, as shown in FIG. 3, a prompt for cluster 2 exists under virtual machine 1, virtual machine 2, and virtual machine 3 at the virtual layer. This prompt indicates that not all virtual machines included in cluster 2 are presented. In addition, there is a separator on the prompt, and the separator is used to indicate a ratio of unpresented virtual machines to presented virtual machines in cluster 2.

In the embodiment of the present invention, the presenting a first object set on a display device in a hierarchical manner of an application layer, a virtual layer, and a physical layer in S110 includes:

according to a fault level of a faulty object at a same layer in the first object set, arranging and presenting, in an area to which the same layer belongs on the display device, objects at the same layer.

Specifically, when objects at a same layer have different fault levels, the mobile terminal may arrange and present, according to a fault level of each object, the objects at the same layer in an area to which the same layer belongs. For example, an object with a high fault level may be arranged in front; if there are multiple objects at a same fault level, the multiple objects having the same fault level may be arranged in order of initials of names (or Pinyin of names) of the objects. Further, different fault levels may have different visual elements, where the visual elements may include at least one of color, geometry, and size. For example, as shown in FIG. 3, application 1 and application 2 at the presented application layer are of a same size and in front. It can be learned that application 1 and application 2 have a same fault level. In addition, application 3 is in back and of a smaller size. It may be learned that the fault level of application 3 is lower than that of application 1 and application 2. In this way, states of network objects can be clearly displayed to a user by arranging the objects according to fault levels and/or assigning different visual elements to different fault levels, so that the user may maintain the network better.

In the embodiment of the present invention, the first object set includes a second object, and the second object is a superior object of the first object. In this case, the presenting a first object set on a display device in a hierarchical manner of an application layer, a virtual layer, and a physical layer includes:

when the display device presents the second object, presenting, based on input for the second object, a subordinate object included in the second object in an area to which a layer of the second object belongs; and when the presented subordinate object included in the second object excludes the first object, and the area to which the layer of the second object belongs presents a prompt indicating that not all subordinate objects included in the second object are presented, presenting, in a scroll manner and based on input for the area to which the layer of the second object belongs, a subordinate object that is not presented and is included in the second object in the area to which the layer of the second object belongs, until the first object is presented on the display device.

Before the presenting a subordinate object included in the second object in an area to which a layer of the second object belongs, the presenting a first object set on a display device in a hierarchical manner of an application layer, a virtual layer, and a physical layer includes:

when the display device presents a peer object of the second object instead of presenting the second object, and the area to which the layer of the second object belongs presents a prompt indicating that not all subordinate objects included in a superior object of the second object are presented, presenting, in a scroll manner and based on input for the area to which the layer of the second object belongs, a subordinate object that is not presented and is included in the superior object of the second object in the area to which the layer of the second object belongs, until the second object is presented on the display device.

Specifically, the mobile terminal may present a related object of cloud-computing to a user in response to input of the user. However, if the display device does not present a first object that the user needs to learn and also does not present a superior object (that is, a second object) of the first object, input may be performed in an area to which a layer of the superior object of the first object belongs. Then, the mobile terminal may present, in a scroll manner and according to the input of the user, a peer object of the superior object of the first object in the area to which the layer of the superior object of the first object belongs, until the superior object (that is, the second object) of the first object is presented. The user may perform input for the second object. After detecting an input signal for the second object, the mobile terminal may present subordinate objects included in the second object in the area to which the layer of the second object belongs. However, due to its limited area of the display device, the mobile terminal may display only some subordinate objects included in the superior object of the first object and present a prompt used to indicate that not all subordinate objects included in the superior object of the first object are presented. Then, when viewing the prompt instead of the first object on the display device of the mobile terminal, the user learns that the display device cannot display all subordinate objects included in the superior object of the first object because there are a relatively large number of objects. In this case, the user may perform input for an area to which a layer of the first object belongs, for example, the user slides a finger on the display device in a direction of object arrangement. Then, the mobile terminal may present, in a scroll manner and according to the input of the user, objects that are not presented and belong to the same superior object as the first object in the area to which the layer of the first object belongs, until the first object is presented on the display device. The user may click the first object, and the mobile terminal may prominently present an object having an association with the first object after detecting an input signal of the user for the first object. Definitely, the first object may also be prominently presented at the same time.

For example, as shown in FIG. 4a, a display device presents application 1, application 2, application 3, cluster 1, cluster 2, cabinet 1, and cabinet 2. Virtual machine 5 (that is, a first object) belongs to cluster 4 (a superior object of the first object), a prompt exists on a virtual tray at the bottom of the virtual layer to indicate that not all clusters included at the application layer are presented. In this case, a user may slide a finger in an area to which the virtual layer belongs, and after detecting an input signal of the user, a mobile terminal may present, in a scroll manner, other clusters that are not presented at the virtual layer, until cluster 4 is presented, as shown in FIG. 4b. Then, the user may click cluster 4. The mobile terminal presents, on its display device according to the click input of the user, virtual machine 1, virtual machine 2, and virtual machine 3 that are included in cluster 4. Due to the limited display area, not all virtual machines included in cluster 4 are presented. In this case, a prompt may be presented on the virtual tray bearing the virtual layer, so as to indicate that not all virtual machines included in cluster 4 are presented. The prompt may include a separator, where the separator may indicate a relationship between the number of objects presented and the number of unpresented objects, as shown in FIG. 4c. The user needs to view an object having an association with virtual machine 5 that belongs to cluster 4, but virtual machine 5 is not displayed and only virtual machine 1, virtual machine 2, and virtual machine 3 (peer objects that belong to the same superior object as virtual machine 5) in cluster 4 (the superior object of virtual machine 5) are displayed. Therefore, the user may slide a finger in an area where the virtual layer is located, for example, sliding left. In this way, the mobile terminal may present virtual machines included in cluster 4 in a scroll manner until virtual machine 5 is presented, as shown in FIG. 4d. Then, the user may perform click input on virtual machine 5, and the mobile terminal may prominently present an object having an association with virtual machine 5 after detecting an input signal for virtual machine 5.

In the embodiment of the present invention, an association refers to a relationship between objects in an operation and implementation process, for example, a resource providing relationship between objects in an operation and implementation process, or a mutual impact relationship between objects in an operation and implementation process.

In the embodiment of the present invention, an object having an association with a first object refers to an object that provides a required implementation resource for operation and implementation of the first object during the operation and implementation with each object, and/or an object for which the first object can provide an implementation resource, and/or an object affected by the operation and implementation of the first object, and/or an object whose operation and implementation can be affected by the first object.

It should be understood that views for describing the embodiment of the present invention are arranged at upper and lower layers. In the embodiment of the present invention, the views may also be arranged at left and right layers, tilt layers, and the like. This is not limited in the embodiment of the present invention. In the embodiment of the present invention, in a view, each layer has a virtual tray. The virtual tray may also not be involved in the embodiment of the present invention. In conclusion, figures for describing the embodiment of the present invention are exemplary and do not impose any limitation on the embodiment of the present invention.

Therefore, in the embodiment of the present invention, a display device presents a first object set in a hierarchical manner of an application layer, a virtual layer, and a physical layer; based on input for a first object, property information of the first object is presented on the display device, where the first object belongs to the first object set; and based on input for first property information, sub-information of the first property information is presented on the display device, where the first property information belongs to the property information of the first object. In this way, a relatively large number of menus, ingresses, and frames on the display device can be reduced, and resource information on a cloud network can be clearly displayed to a user.

The foregoing describes the method for displaying resources according to the embodiments of the present invention with reference to FIG. 1 to FIG. 17. The following describes an apparatus and a mobile terminal for displaying resources according to the embodiments of the present invention with reference to FIG. 18 to FIG. 23.

Figure 18:
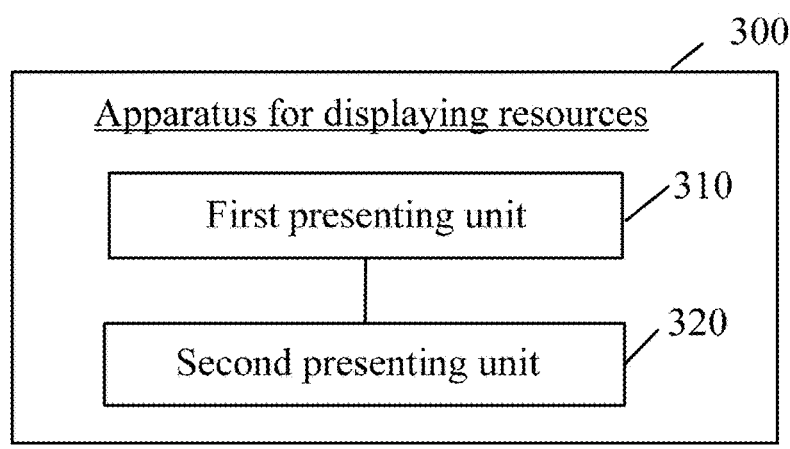
FIG. 18 is a schematic block diagram of an apparatus for displaying resources according to an embodiment of the present invention.
Figure 19:
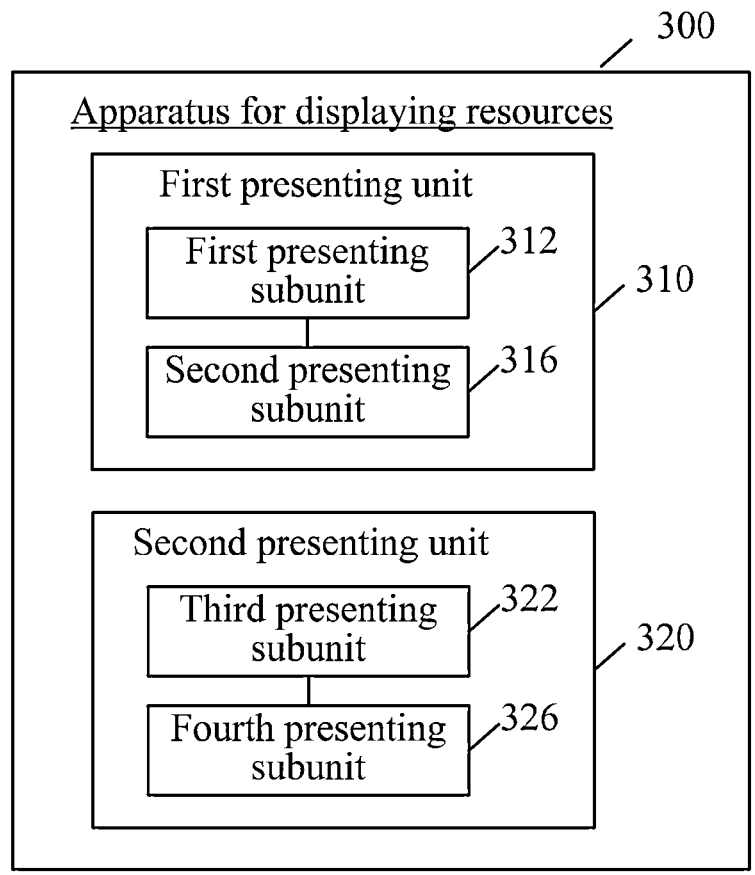
FIG. 19 is a schematic block diagram of an apparatus for displaying resources according to another embodiment of the present invention.

FIG. 18 is a schematic block diagram of an apparatus for displaying resources 300 according to an embodiment of the present invention. As shown in FIG. 18, the apparatus for displaying resources 300 includes:

a first presenting unit 310, configured to present a first object set on a display device in a hierarchical manner of an application layer, a virtual layer, and a physical layer, where the first object set is divided into the application layer, the virtual layer, and the physical layer; and a second presenting unit 320, configured to, based on input for a first object, prominently present, on the display device, an object having an association with the first object, where the first object belongs to the first object set.

Optionally, when the first object is an application, the object having an association with the first object includes a virtual resource corresponding to the first object and a physical resource that corresponds to the virtual resource corresponding to the first object;

when the first object is a physical resource, the object having an association with the first object includes a virtual resource corresponding to the first object and an application that corresponds to the virtual resource corresponding to the first object; and when the first object is a virtual resource, the object having an association with the first object includes an application corresponding to the first object and a physical resource corresponding to the first object.

Optionally, the first presenting unit 310 is specifically configured to:

present the first object set in a manner where an upper layer, an intermediate layer, and a lower layer are isolated from each other in space, where the application layer is at the upper layer, the virtual layer is at the intermediate layer, the physical layer is at the lower layer, and a virtual tray is formed at the bottom of each layer to serve as a reference for object arrangement at the layer.

Optionally, the virtual tray further presents a prompt, and the prompt is used to indicate whether there is an unpresented object at a layer borne by the virtual tray.

Optionally, the prompt is of a thin thread shape, a separator is presented in the middle, and the separator is used to indicate a ratio of presented objects to unpresented objects at the layer borne by the virtual tray.

Optionally, the first presenting unit 310 is specifically configured to:

according to a fault level of a faulty object at a same layer in the first object set, arrange and present, in an area to which the same layer belongs on the display device, objects at the same layer.

Optionally, objects at different fault levels have different visual elements.

Optionally, the first presenting unit 310 is specifically configured to:

according to a fault level of a faulty object at a same layer in the first object set, arrange and present, in an area to which the same layer belongs on the display device, objects at the same layer, where an object at a relatively high fault level is arranged in a relatively front position in the area to which the same layer belongs, and when there are multiple objects at a same fault level, the multiple objects at the same fault level are sorted according to initials of names or initials of Pinyin of names.

Optionally, the first presenting unit 310 includes:

a first presenting subunit 312, configured to, when the display device presents the second object, present, based on input for the second object, a subordinate object included in the second object in an area to which a layer of the second object belongs, where the first object set includes the second object, and the second object is a superior object of the first object; and when the presented subordinate object included in the second object excludes the first object, and the area to which the layer of the second object belongs presents a prompt indicating that not all subordinate objects included in the second object are presented, present, in a scroll manner and based on input for the area to which the layer of the second object belongs, a subordinate object that is not presented and is included in the second object in the area to which the layer of the second object belongs, until the first object is presented on the display device.

Optionally, the first presenting unit 310 further includes:

a second presenting subunit 316, configured to, when the display device presents a peer object of the second object instead of presenting the second object, and the area to which the layer of the second object belongs presents a prompt indicating that not all subordinate objects included in a superior object of the second object are presented, present, in a scroll manner and based on input for the area to which the layer of the second object belongs, a subordinate object that is not presented and is included in the superior object of the second object in the area to which the layer of the second object belongs, until the second object is presented on the display device.

Optionally, the second presenting unit 320 includes:

a third presenting subunit 322, configured to prominently present, on the display device, the object having an association with the first object, where the object having an association with the first object includes a third object; and a fourth presenting subunit 326, configured to prominently present, based on input for the third object, an object having an association with the first object among subordinate objects of the second object in the area to which the layer of the second object belongs.

Optionally, the second presenting unit 320 is specifically configured to:

prominently present the object having an association with the first object in at least one of the following manners: a manner of dynamically displaying the object having an association with the first object, a manner of changing a location of the object having an association with the first object, a manner of highlighting the object having an association with the first object, and a manner of dimming an object having no association with the first object.

Therefore, in the embodiment of the present invention, a first object set is presented on a display device in a hierarchical manner of an application layer, a virtual layer, and a physical layer, and based on input for a first object, an object having an association with the first object is prominently presented on the display device, so that logical connection relationships between objects on a cloud computing network can be clearly displayed to a user. In this way, when a fault occurs on the cloud computing network, the user can quickly locate a fault source and a related object, thereby improving efficiency of handling a cloud fault for the user.

Figure 20:
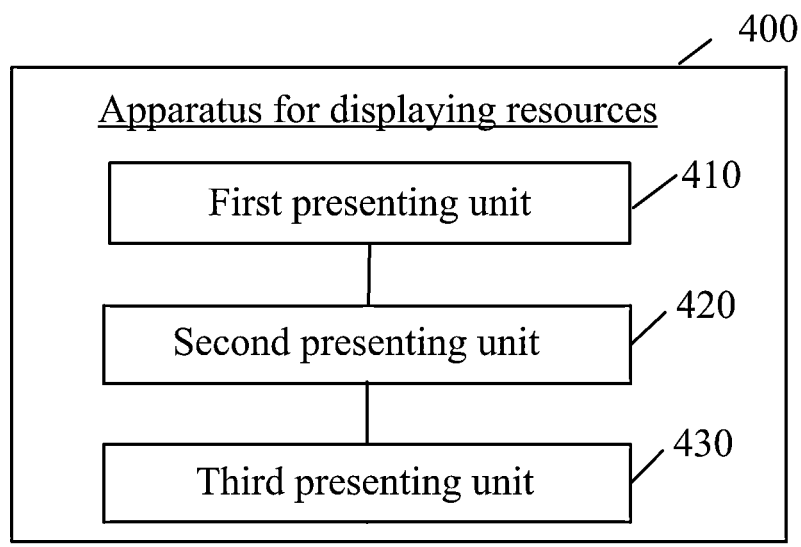
FIG. 20 is a schematic block diagram of an apparatus for displaying resources according to another embodiment of the present invention.

FIG. 20 is a schematic block diagram of an apparatus for displaying resources 400 according to an embodiment of the present invention. As shown in FIG. 20, the apparatus 400 includes:

a first presenting unit 410, configured to present a first object set on a display device in a hierarchical manner of an application layer, a virtual layer, and a physical layer;

a second presenting unit 420, configured to, based on input for a first object, present property information of the first object on the display device, where the first object belongs to the first object set; and a third presenting unit 430, configured to, based on input for first property information, present sub-information of the first property information on the display device, where the first property information belongs to the property information of the first object.

Optionally, the first presenting unit 410 is specifically configured to:

present the first object set in a manner where an upper layer, an intermediate layer, and a lower layer are isolated from each other in space, where the application layer is at the upper layer, the virtual layer is at the intermediate layer, the physical layer is at the lower layer, and a virtual tray is formed at the bottom of each layer to serve as a reference for object arrangement at the layer.

Optionally, the virtual tray further presents a prompt, and the prompt is used to indicate whether there is an unpresented object at a layer borne by the virtual tray.

Optionally, the prompt is of a thin thread shape, a separator is presented in the middle, and the separator is used to indicate a ratio of presented objects to unpresented objects at the layer borne by the virtual tray.

Optionally, the first presenting unit 410 is specifically configured to:

according to a fault level of a faulty object at a same layer in the first object set, arrange and present, in an area to which the same layer belongs on the display device, objects at the same layer.

Optionally, objects at different fault levels have different visual elements.

Optionally, the first presenting unit 410 is specifically configured to:

according to a fault level of a faulty object at a same layer in the first object set, arrange and present, in an area to which the same layer belongs on the display device, objects at the same layer, where an object at a relatively high fault level is arranged in a relatively front position in the area to which the same layer belongs, and when there are multiple objects at a same fault level, the multiple objects at the same fault level are sorted according to initials of names or initials of Pinyin of names.

Figure 21:
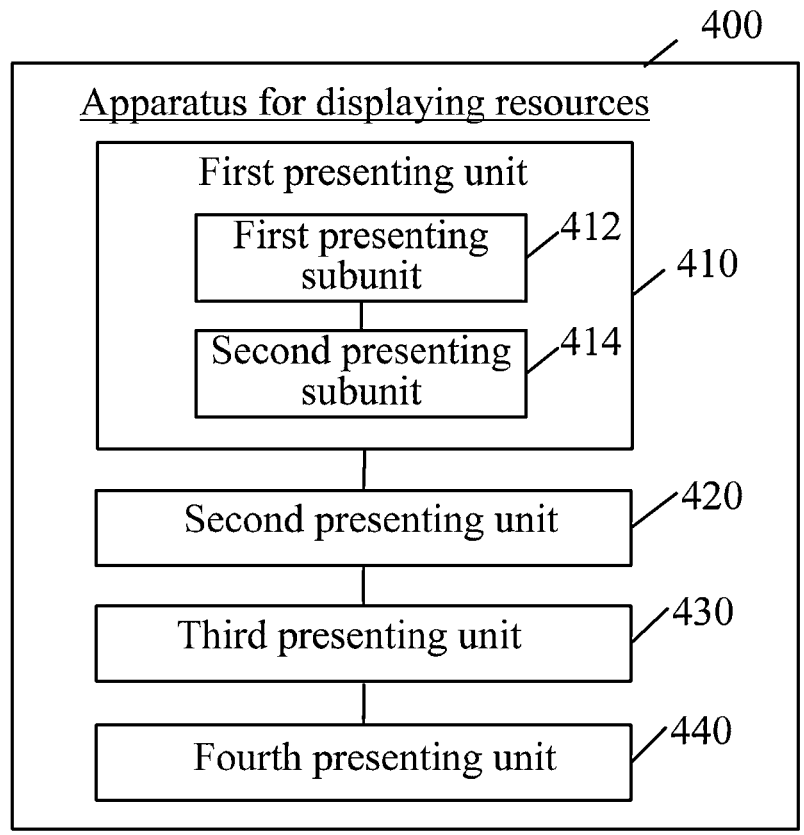
FIG. 21 is a schematic block diagram of an apparatus for displaying resources according to another embodiment of the present invention.

FIG. 21 is a schematic block diagram of an apparatus for displaying resources 400 according to an embodiment of the present invention. As shown in FIG. 21, the first presenting unit 410 includes:

a first presenting subunit 412, configured to, when the display device presents the second object, present, based on input for the second object, a subordinate object included in the second object in an area to which a layer of the second object belongs, where the first object set includes the second object, and the second object is a superior object of the first object; and when the presented subordinate object included in the second object excludes the first object, and the area to which the layer of the second object belongs presents a prompt indicating that not all subordinate objects included in the second object are presented, present, in a scroll manner and based on input for the area to which the layer of the second object belongs, a subordinate object that is not presented and is included in the second object in the area to which the layer of the second object belongs, until the first object is presented on the display device.

Optionally, the first presenting unit 410 further includes:

a second presenting subunit 414, configured to, when the display device presents a peer object of the second object instead of presenting the second object, and the area to which the layer of the second object belongs presents a prompt indicating that not all subordinate objects included in a superior object of the second object are presented, present, in a scroll manner and based on input for the area to which the layer of the second object belongs, a subordinate object that is not presented and is included in the superior object of the second object in the area to which the layer of the second object belongs, until the second object is presented on the display device.

Optionally, the apparatus 400 further includes:

a fourth presenting unit 440, configured to, based on input for selecting a layer, present, on the display device, a resource consumption condition of the layer.

Optionally, presented information is switched in a cube rotation manner.

Therefore, in the embodiment of the present invention, a display device presents a first object set in a hierarchical manner of an application layer, a virtual layer, and a physical layer; based on input for a first object, property information of the first object is presented on the display device, where the first object belongs to the first object set; and based on input for first property information, sub-information of the first property information is presented on the display device, where the first property information belongs to the property information of the first object. In this way, a relatively large number of menus, ingresses, and frames on the display device can be reduced, and resource information on a cloud network can be clearly displayed to a user.

Figure 22:
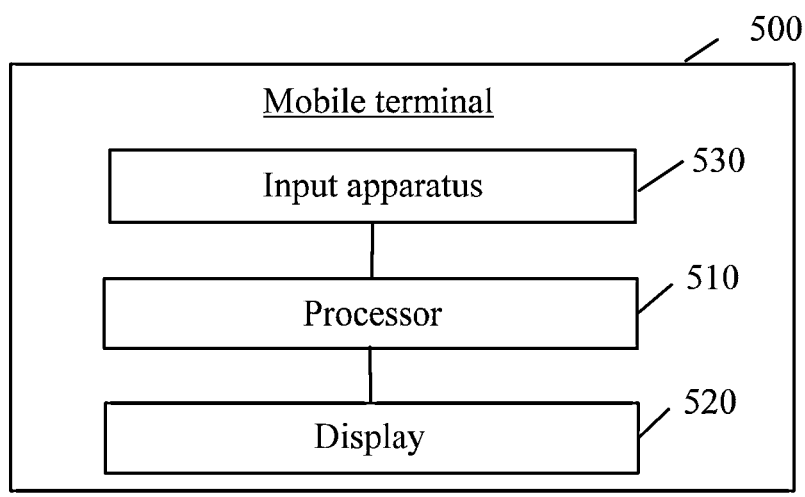
FIG. 22 is a schematic block diagram of a mobile terminal according to an embodiment of the present invention.

FIG. 22 is a schematic block diagram of a mobile terminal 500 according to an embodiment of the present invention. As shown in FIG. 22, the mobile terminal 500 at least includes a processor 510, a display 520, and an input apparatus 530.

Particularly, when the mobile terminal is an interactive touch terminal, an interactive touchscreen may be the display 520 and may also be the input apparatus 530.

The processor 510 is configured to instruct the display 520 to present a first object set in a hierarchical manner of an application layer, a virtual layer, and a physical layer;

the display 520 is configured to present the first object set in a hierarchical manner of an application layer, a virtual layer, and a physical layer according to the instruction of the processor 510;

the input apparatus 530 is configured to generate input for a first object, where the first object belongs to the first object set;

the processor 510 is further configured to instruct, according to the input generated by the input apparatus 530 for the first object, the display 520 to prominently present an object having an association with the first object; and the display 520 is further configured to prominently present, on the display device according to the instruction of the processor 510, the object having an association with the first object.

Optionally, when the first object is an application, the object having an association with the first object includes a virtual resource corresponding to the first object and a physical resource that corresponds to the virtual resource corresponding to the first object;

when the first object is a physical resource, the object having an association with the first object includes a virtual resource corresponding to the first object and an application that corresponds to the virtual resource corresponding to the first object; and when the first object is a virtual resource, the object having an association with the first object includes an application corresponding to the first object and a physical resource corresponding to the first object.

Optionally, the processor 510 is specifically configured to instruct the display 520 to present the first object set in a manner where an upper layer, an intermediate layer, and a lower layer are isolated from each other in space, where the application layer is at the upper layer, the virtual layer is at the intermediate layer, the physical layer is at the lower layer, and a virtual tray is formed at the bottom of each layer to serve as a reference for object arrangement at the layer; and The display 520 is specifically configured to present, according to the instruction of the processor 510, the first object set in the manner where the upper layer, the intermediate layer, and the lower layer are isolated from each other in space, where the application layer is at the upper layer, the virtual layer is at the intermediate layer, the physical layer is at the lower layer, and the virtual tray is formed at the bottom of each layer to serve as the reference for the object arrangement at the layer.

Optionally, the virtual tray further presents a prompt, and the prompt is used to indicate whether there is an unpresented object at a layer borne by the virtual tray.

Optionally, the prompt is of a thin thread shape, a separator is presented in the middle, and the separator is used to indicate a ratio of presented objects to unpresented objects at the layer borne by the virtual tray.

Optionally, the processor 510 is specifically configured to instruct, according to a fault level of a faulty object at a same layer in the first object set, the display 520 to arrange and present, in an area to which the same layer belongs, objects at the same layer; and the display 520 is specifically configured to, according to the instruction of the processor 510 and the fault level of the faulty object at the same layer in the first object set, arrange and present, in the area to which the same layer belongs, the objects at the same layer.

Optionally, objects at different fault levels have different visual elements.

Optionally, the processor 510 instructs the display 520 to, according to a fault level of a faulty object at a same layer in the first object set, arrange and present, in an area to which the same layer belongs, objects at the same layer, where an object at a relatively high fault level is arranged in a relatively front position in the area to which the same layer belongs, and when there are multiple objects at a same fault level, the multiple objects at the same fault level are sorted according to initials of names or initials of Pinyin of names; and according to the instruction of the processor 510 and the fault level of the faulty object at the same layer in the first object set, the display 520 arranges and presents, in the area to which the same layer belongs, the objects at the same layer, where an object at a relatively high fault level is arranged in a relatively front position in the area to which the same layer belongs, and when there are multiple objects at a same fault level, the multiple objects at the same fault level are sorted according to initials of names or initials of Pinyin of names.

Optionally, the input apparatus 530 is specifically configured to generate input for the second object when the display 520 presents the second object;

the processor 510 is specifically configured to instruct, according to the input generated by the processor 530 for the second object, the display 520 to present a subordinate object included in the second object in an area to which a layer of the second object belongs, where the first object set includes the second object, and the second object is a superior object of the first object;

the display 520 is specifically configured to present, according to the instruction of the processor, the subordinate object included in the second object in the area to which the layer of the second object belongs;

the input apparatus 530 is further specifically configured to, when the subordinate object that is included in the second object and presented on the display 520 excludes the first object, and the area to which the layer of the second object belongs presents a prompt indicating that not all subordinate objects included in the second object are presented, generate input for the area to which the layer of the second object belongs; and the processor 510 is further specifically configured to instruct, according to the input generated by the input apparatus for the area to which the layer of the second object belongs, the display 520 to present, in a scroll manner, a subordinate object that is not presented and is included in the second object in the area to which the layer of the second object belongs, until the first object is presented on the display 520.

The display 520 is further specifically configured to present, in a scroll manner and according to the instruction of the processor, the subordinate object that is not presented and is included in the second object in the area to which the layer of the second object belongs, until the first object is presented on the display 520.

Optionally, the input apparatus 530 is further specifically configured to, when the display 520 presents a peer object of the second object instead of presenting the second object, and the area to which the layer of the second object belongs presents a prompt indicating that not all subordinate objects included in a superior object of the second object are presented, generate input for the area to which the layer of the second object belongs;

the processor 510 is further specifically configured to present, in a scroll manner and according to the input generated by the input apparatus for the area to which the layer of the second object belongs, a subordinate object that is not presented and is included in the superior object of the second object in the area to which the layer of the second object belongs, until the second object is presented on the display 520; and the display 520 is further specifically configured to present, in a scroll manner and according to the instruction of the processor 510, the subordinate object that is not presented and is included in the superior object of the second object in the area to which the layer of the second object belongs, until the second object is presented on the display 520.

Optionally, the processor 510 is specifically configured to instruct the display 510 to prominently present the object having an association with the first object, where the object having an association with the first object includes a third object;

the display 520 is further specifically configured to prominently present, according to the instruction of the processor 510, the object having an association with the first object, where the object having an association with the first object includes a third object;

optionally, the input apparatus 530 is specifically configured to generate input for the third object;

the processor 520 is specifically configured to instruct, according to the input generated by the input apparatus 530 for the third object, the display 520 to prominently present an object having an association with the first object among subordinate objects of the second object in the area to which the layer of the second object belongs; and the display 530 is specifically configured to prominently present, according to the instruction of the processor 520, an object having an association with the first object among subordinate objects of the third object in the area to which the layer of the third object belongs.

Optionally, the processor 510 is specifically configured to instruct the display 520 to prominently present the object having an association with the first object in at least one of the following manners: a manner of dynamically displaying the object having an association with the first object, a manner of changing a location of the object having an association with the first object, a manner of highlighting the object having an association with the first object, and a manner of dimming an object having no association with the first object; and the display 520 is specifically configured to prominently present, according to the instruction of the processor 510, the object having an association with the first object in at least one of the following manners: a manner of dynamically displaying the object having an association with the first object, a manner of changing a location of the object having an association with the first object, a manner of highlighting the object having an association with the first object, and a manner of dimming an object having no association with the first object.

Therefore, in the embodiment of the present invention, a first object set is presented on a display device in a hierarchical manner of an application layer, a virtual layer, and a physical layer, and based on input for a first object, an object having an association with the first object is prominently presented on the display device, so that logical connection relationships between objects on a cloud computing network can be clearly displayed to a user. In this way, when a fault occurs on the cloud computing network, the user can quickly locate a fault source and a related object, thereby improving efficiency of handling a cloud fault for the user.

Figure 23:
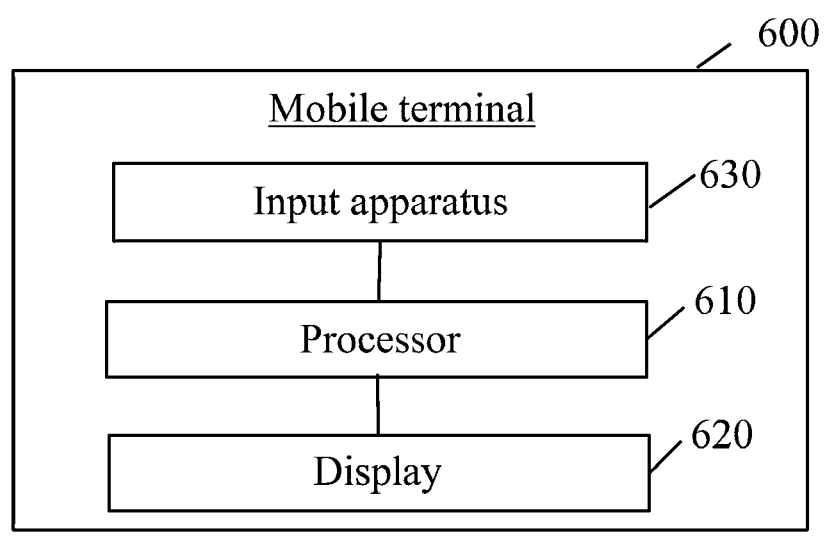
FIG. 23 is a schematic block diagram of a mobile terminal according to another embodiment of the present invention.

FIG. 23 is a schematic block diagram of a mobile terminal 600 according to an embodiment of the present invention. As shown in FIG. 23, the mobile terminal 600 at least includes a processor 610, a display 620, and an input apparatus 630.

Particularly, when the mobile terminal is an interactive touch terminal, an interactive touchscreen may be the display 620 and may also be the input apparatus 630.

The processor 610 is configured to instruct the display 620 to present a first object set in a hierarchical manner of an application layer, a virtual layer, and a physical layer;

the display 620 is configured to present the first object set in a hierarchical manner of an application layer, a virtual layer, and a physical layer according to the instruction of the processor 610;

the input apparatus 630 is configured to generate input for a first object, where the first object belongs to the first object set;

the processor 610 is further configured to instruct, according to the first object generated by the input apparatus 630, the display 620 to present property information of the first object;

the display 620 is further configured to present the property information of the first object according to the instruction of the processor 610;

the input apparatus 630 is further configured to generate input for first property information, where the first property information belongs to the property information of the first object;

the processor 610 is further configured to instruct, according to the input generated by the input apparatus 630 for the first property information, the display 620 to present sub-information of the first property information; and the display 620 is further configured to present the sub-information of the first property information according to the instruction of the processor 610.

Optionally, the processor 610 is specifically configured to instruct the display 520 to present the first object set in a manner where an upper layer, an intermediate layer, and a lower layer are isolated from each other in space, where the application layer is at the upper layer, the virtual layer is at the intermediate layer, the physical layer is at the lower layer, and a virtual tray is formed at the bottom of each layer to serve as a reference for object arrangement at the layer; and the display 620 is specifically configured to present, according to the instruction of the processor 510, the first object set in the manner where the upper layer, the intermediate layer, and the lower layer are isolated from each other in space, where the application layer is at the upper layer, the virtual layer is at the intermediate layer, the physical layer is at the lower layer, and the virtual tray is formed at the bottom of each layer to serve as the reference for object arrangement at the layer.

Optionally, the virtual tray further presents a prompt, and the prompt is used to indicate whether there is an unpresented object at a layer borne by the virtual tray.

Optionally, the prompt is of a thin thread shape, a separator is presented in the middle, and the separator is used to indicate a ratio of presented objects to unpresented objects at the layer borne by the virtual tray.

Optionally, the processor 610 is specifically configured to instruct, according to a fault level of a faulty object at a same layer in the first object set, the display 620 to arrange and present, in an area to which the same layer belongs, objects at the same layer;

the display 620 is specifically configured to, according to the instruction of the processor 610 and the fault level of the faulty object at the same layer in the first object set, arrange and present, in the area to which the same layer belongs, the objects at the same layer; and optionally, objects at different fault levels have different visual elements.

Optionally, the processor 610 instructs the display 620 to, according to a fault level of a faulty object at a same layer in the first object set, arrange and present, in an area to which the same layer belongs, objects at the same layer, where an object at a relatively high fault level is arranged in a relatively front position in the area to which the same layer belongs, and when there are multiple objects at a same fault level, the multiple objects at the same fault level are sorted according to initials of names or initials of Pinyin of names; and according to the instruction of the processor 610 and the fault level of the faulty object at the same layer in the first object set, the display 620 arranges and presents, in the area to which the same layer belongs, the objects at the same layer, where an object at a relatively high fault level is arranged in a relatively front position in the area to which the same layer belongs, and when there are multiple objects at a same fault level, the multiple objects at the same fault level are sorted according to initials of names or initials of Pinyin of names.

Optionally, the input apparatus 630 is specifically configured to generate input for the second object when the display 620 presents the second object;

the processor 610 is specifically configured to instruct, according to the input generated by the processor 630 for the second object, the display 620 to present a subordinate object included in the second object in an area to which a layer of the second object belongs, where the first object set includes the second object, and the second object is a superior object of the first object;

the display 620 is specifically configured to present, according to the instruction of the processor, the subordinate object included in the second object in the area to which the layer of the second object belongs;

the input apparatus 630 is further specifically configured to, when the subordinate object that is included in the second object and presented on the display 620 excludes the first object, and the area to which the layer of the second object belongs presents a prompt indicating that not all subordinate objects included in the second object are presented, generate input for the area to which the layer of the second object belongs; and the processor 610 is further specifically configured to instruct, according to the input generated by the input apparatus for the area to which the layer of the second object belongs, the display 620 to present, in a scroll manner, a subordinate object that is not presented and is included in the second object in the area to which the layer of the second object belongs, until the first object is presented on the display 620.

The display 620 is further specifically configured to present, in a scroll manner and according to the instruction of the processor, the subordinate object that is not presented and is included in the second object in the area to which the layer of the second object belongs, until the first object is presented on the display 620.

Optionally, the input apparatus 630 is further specifically configured to, when the display 620 presents a peer object of the second object instead of presenting the second object, and the area to which the layer of the second object belongs presents a prompt indicating that not all subordinate objects included in a superior object of the second object are presented, generate input for the area to which the layer of the second object belongs;

the processor 610 is further specifically configured to present, in a scroll manner and according to the input generated by the input apparatus for the area to which the layer of the second object belongs, a subordinate object that is not presented and is included in the superior object of the second object in the area to which the layer of the second object belongs, until the second object is presented on the display 620; and the display 620 is further specifically configured to present, in a scroll manner and according to the instruction of the processor 610, the subordinate object that is not presented and is included in the superior object of the second object in the area to which the layer of the second object belongs, until the second object is presented on the display 620.

Optionally, the input apparatus 630 is further configured to generate input for selecting a layer;

the processor 610 is further configured to instruct, according to the input generated by the input apparatus for selecting a layer, the display 620 to present a resource consumption condition of the layer; and the display 620 is further configured to present the resource consumption condition of the layer according to the instruction of the processor 620.

Optionally, the processor 610 is specifically configured to instruct the display 620 to switch presented information in a cube rotation manner; and the display 620 is specifically configured to switch presented information in a cube rotation manner according to the instruction of the processor 610.

Therefore, in the embodiment of the present invention, a display device presents a first object set in a hierarchical manner of an application layer, a virtual layer, and a physical layer; based on input for a first object, property information of the first object is presented on the display device, where the first object belongs to the first object set; and based on input for first property information, sub-information of the first property information is presented on the display device, where the first property information belongs to the property information of the first object. In this way, a relatively large number of menus, ingresses, and frames on the display device can be reduced, and resource information on a cloud network can be clearly displayed to a user.

It should be understood that characteristics in the method embodiments of the present invention apply to the device embodiments of the present invention in an appropriate situation, and characteristics in the device embodiments of the present invention also apply to the method embodiments of the present invention in an appropriate situation.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, division of the unit is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or part of the technical solutions may be implemented in a form of a software product. The computer software product is stored in a storage medium, and includes several instructions for instructing a computer device (which may be a personal computer, a server, a network device or the like) to perform all or a part of the steps of the methods described in the embodiment of the present invention. The foregoing storage medium includes: any medium that can store program code, such as a USB flash disk, a removable hard disk, a read-only memory (Read-Only Memory, ROM), a random access memory (Random Access Memory, RAM), a magnetic disk, or an optical disk.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for displaying cloud computing resource information, comprising:
presenting object sets on a display device in a hierarchical manner of an application layer, a virtual layer, and a physical layer of the cloud computing, wherein
the application layer comprises one or more applications, the virtual layer comprises one or more virtual resources enabling the one or more applications, and the physical layer comprises one or more physical resources enabling the one or more virtual resources; and
the object sets include a first object set comprising objects including at least one physical resource in the physical layer, at least one virtual resource in the virtual layer, and at least one application in the application layer, wherein all objects in the first object set are mutually associated with each other;
enabling a user to select any object in the first object set displayed on the display device;
receiving an input indicating an object in the first object set selected by the user; and
based on the input, prominently presenting, on the display device, all other objects in the first object set associated with the selected object; and, wherein the first object set comprises a first object and a second object, the second object being a superior object to the first object, and presenting the first object set on the display device in the hierarchical manner of the application layer, the virtual layer, and the physical layer comprises:

when the display device presents the second object, presenting, based on the input for the second object, a subordinate object in the second object in an area to which a layer of the second object belongs; and when the presented subordinate object comprised the second object excludes the first object, and the area to which the layer of the second object belongs presents a prompt indicating that not all subordinate objects in the second object are presented, presenting, in a scroll manner and based on the input for the area to which the layer of the second object belongs, a subordinate object that is not presented and is in the second object in the area to which the layer of the second object belongs, until the first object is presented on the display device, wherein before presenting the subordinate object in the second object in the area to which the layer of the second object belongs, presenting the first object set on the display device in the hierarchical manner of the application layer, the virtual layer, and the physical layer comprises:

when the display device presents a peer object of the second object instead of presenting the second object, and the area to which the layer of the second object belongs presents a prompt indicating that not all subordinate objects in the superior object of the second object are presented, presenting, in a scroll manner and based on the input for the area to which the layer of the second object belongs, a subordinate object that is not presented and is comprised in the superior object of the second object in the area to which the layer of the second object belongs, until the second object is presented on the display device.

2. The method according to claim 1, wherein:

when the selected object is the at least one application, the objects in the first object set that are prominently displayed as being associated with the selected object comprise the at least one virtual resource and the at least one physical resource associated with the selected object;

when the selected object is the at least one physical resource, the objects in the first object set that are prominently displayed as being associated with the selected object comprise the at least one virtual resource and the at least one application associated with the selected object; and when the selected object is the at least one virtual resource, the objects in the first object set that are prominently displayed as being associated with the selected object comprise the at least one application and the at least one physical resource associated with the first object.

3. The method according to claim 1, wherein the presenting the first object set on the display device in the hierarchical manner of the application layer, the virtual layer, and the physical layer comprises:

presenting the first object set in a manner where an upper layer, an intermediate layer, and a lower layer are isolated from each other in space, wherein the application layer is at the upper layer, the virtual layer is at the intermediate layer, the physical layer is at the lower layer, and a virtual tray is formed at the bottom of each layer to serve as a reference for object arrangement at the layer.

4. The method according to claim 3, wherein the virtual tray further presents a prompt, and the prompt is used to indicate whether there is an unpresented object at a layer borne by the virtual tray.

5. The method according to claim 4, wherein the prompt is of a thread shape, a separator is presented in the middle, and the separator is used to indicate a ratio of presented objects to unpresented objects at the layer borne by the virtual tray.

6. The method according to claim 1, wherein presenting the first object set on the display device in the hierarchical manner of the application layer, the virtual layer, and the physical layer comprises:

according to a fault level of a faulty object at a same layer in the first object set, arranging and presenting, in an area to which the same layer belongs on the display device, objects at the same layer.

7. The method according to claim 6, wherein objects at different fault levels have different visual elements.

8. The method according to claim 6, wherein arranging and presenting, in the area to which the same layer belongs on the display device, the objects at the same layer, comprises:

arranging an object at a relatively high fault level in a relatively front position in the area to which the same layer belongs, and when there are multiple objects at a same fault level, sorting the multiple objects at the same fault level according to initials of names or initials of Pinyin of names.

9. The method according to claim 1, wherein the prominently presenting the object having the association with the selected object in the first object set comprises:

prominently presenting, on the display device, the object having the association with the selected object, wherein the object having the association with the selected object comprises a third object; and prominently presenting, based on an input for the third object, the object having the association with the selected object among subordinate objects of the third object in an area to which a layer of the third object belongs.

10. The method according to claim 1, wherein prominently presenting, on the display device, the object having the association with the first object comprises:

prominently presenting the object having the association with the selected object in at least one of the following manners: a manner of dynamically displaying the object having the association with the first object, a manner of changing a location of the object having the association with the first object, a manner of highlighting the object having the association with the first object, and a manner of dimming an object having no association with the first object.

11. A method for displaying cloud computing resource information, comprising:

presenting object sets on a display device in a hierarchical manner of an application layer, a virtual layer, and a physical layer of the cloud computing, wherein
the application layer comprises one or more applications, the virtual layer comprises one or more virtual resources enabling the one or more applications, and the physical layer comprises one or more physical resources enabling the one or more virtual resources; and
the object sets include a first object set comprising objects including at least one physical resource in the physical layer, at least one virtual resource in the virtual layer, and at least one application in the application layer, wherein all objects in the first object set are mutually associated with each other;

enabling a user to select any object in the first object set displayed on the display device;

receiving an input indicating an object in the first object set selected by the user;

based on the input, prominently presenting, on the display device, all other objects in the first object set associated with the selected object; and, wherein the first object set comprises a first object and a second object, the second object being a superior object to the first object, and presenting the first object set on the display device in the hierarchical manner of the application layer, the virtual layer, and the physical layer comprises:

when the display device presents the second object, presenting, based on the input for the second object, a subordinate object in the second object in an area to which a layer of the second object belongs; and when the presented subordinate object comprised the second object excludes the first object, and the area to which the layer of the second object belongs presents a prompt indicating that not all subordinate objects in the second object are presented, presenting, in a scroll manner and based on the input for the area to which the layer of the second object belongs, a subordinate object that is not presented and is in the second object in the area to which the layer of the second object belongs, until the first object is presented on the display device, wherein before presenting the subordinate object in the second object in the area to which the layer of the second object belongs, presenting the first object set on the display device in the hierarchical manner of the application layer, the virtual layer, and the physical layer comprises:

when the display device presents a peer object of the second object instead of presenting the second object, and the area to which the layer of the second object belongs presents a prompt indicating that not all subordinate objects in the superior object of the second object are presented, presenting, in a scroll manner and based on the input for the area to which the layer of the second object belongs, a subordinate object that is not presented and is comprised in the superior object of the second object in the area to which the layer of the second object belongs, until the second object is presented on the display device.

12. The method according to claim 11, wherein the presenting the first object set on the display device in the hierarchical manner of the application layer, the virtual layer, and the physical layer comprises:

presenting the first object set in a manner where an upper layer, an intermediate layer, and a lower layer are isolated from each other in space, wherein the application layer is at the upper layer, the virtual layer is at the intermediate layer, the physical layer is at the lower layer, and a virtual tray is formed at the bottom of each layer to serve as a reference for object arrangement at the layer.

13. The method according to claim 11, wherein a virtual tray further presents a prompt, and the prompt is used to indicate whether there is an unpresented object at a layer borne by the virtual tray.

14. The method according to claim 13, wherein the prompt is of a thin thread shape, a separator is presented in the middle, and the separator is used to indicate a ratio of presented objects to unpresented objects at the layer borne by the virtual tray.

15. The method according to any one of claim 11, wherein presenting the first object set on the display device in the hierarchical manner of the application layer, the virtual layer, and the physical layer comprises:

according to a fault level of a faulty object at a same layer in the first object set, arranging and presenting, in an area to which the same layer belongs on the display device, objects at the same layer.

16. The method according to claim 15, wherein objects at different fault levels have different visual elements.

17. The method according to claim 15, wherein arranging and presenting, in the area to which the same layer belongs on the display device, the objects at the same layer, comprises: arranging an object at a relatively high fault level in a relatively front position in the area to which the same layer belongs, and when there are multiple objects at a same fault level, sorting the multiple objects at the same fault level according to initials of names or initials of Pinyin of names.

18. The method according to claim 11, further comprising:

based on an input for selecting a layer, presenting, on the display device, a resource consumption condition of the layer.

19. The method according to claim 11, wherein any information being presented is switched in a cube rotation manner.

20. An apparatus for displaying cloud computing resource information, comprising:

a first presenting unit, configured to present object sets on a display device in a hierarchical manner of an application layer, a virtual layer, and a physical layer of the cloud computing, wherein the application layer comprises one or more applications, the virtual layer comprises one or more virtual resources enabling the one or more applications, and the physical layer comprises one or more physical resources enabling the one or more virtual resources; and the object sets includes a first object set comprising objects including at least one physical resource in the physical layer, at least one virtual resource in the virtual layer, and at least one application in the application layer, wherein all objects in the first object set are mutually associated with each other;

enable a user to select any object in the first object set displayed on the display device; and receive an input indicating an object in the first object set selected by the user; and a second presenting unit, configured to, based on the input, prominently present, on the display device, all other objects in the first object set associated with the selected object; and, wherein the first object set comprises a first object and a second object, the second object being a superior object to the first object, and presenting the first object set on the display device in the hierarchical manner of the application layer, the virtual layer, and the physical layer comprises:

when the display device presents the second object, presenting, based on the input for the second object, a subordinate object in the second object in an area to which a layer of the second object belongs; and when the presented subordinate object comprised the second object excludes the first object, and the area to which the layer of the second object belongs presents a prompt indicating that not all subordinate objects in the second object are presented, presenting, in a scroll manner and based on the input for the area to which the layer of the second object belongs, a subordinate object that is not presented and is in the second object in the area to which the layer of the second object belongs, until the first object is presented on the display device, wherein before presenting the subordinate object in the second object in the area to which the layer of the second object belongs, presenting the first object set on the display device in the hierarchical manner of the application layer, the virtual layer, and the physical layer comprises:

when the display device presents a peer object of the second object instead of presenting the second object, and the area to which the layer of the second object belongs presents a prompt indicating that not all subordinate objects in the superior object of the second object are presented, presenting, in a scroll manner and based on the input for the area to which the layer of the second object belongs, a subordinate object that is not presented and is comprised in the superior object of the second object in the area to which the layer of the second object belongs, until the second object is presented on the display device.

21. An apparatus for displaying cloud computing resource information, comprising:

a first presenting unit, configured to
present object sets on a display device in a hierarchical manner of an application layer, a virtual layer, and a physical layer of the cloud computing, wherein the application layer comprises one or more applications, the virtual layer comprises one or more virtual resources enabling the one or more applications, and the physical layer comprises one or more physical resources enabling the one or more virtual resources; and the object sets include a first object set comprising objects including at least one physical resource in the physical layer, at least one virtual resource in the virtual layer, and at least one application in the application layer, wherein all objects in the first object set are mutually associated with each other;
enable a user to select any object in the first object set displayed on the display device and property information regarding any object in the first object set; and
receive an input indicating an object in the first object set selected by the user; and a second presenting unit, configured to, based on the input, present property information of the selected object on the display device; and a third presenting unit, configured to, based on an input for selecting the property information, present sub-information of the selected property information on the display device, wherein the selected property information belongs to the property information of the selected object; and, wherein the first object set comprises a first object and a second object, the second object being a superior object to the first object, and presenting the first object set on the display device in the hierarchical manner of the application layer, the virtual layer, and the physical layer comprises:

when the display device presents the second object, presenting, based on the input for the second object, a subordinate object in the second object in an area to which a layer of the second object belongs; and when the presented subordinate object comprised the second object excludes the first object, and the area to which the layer of the second object belongs presents a prompt indicating that not all subordinate objects in the second object are presented, presenting, in a scroll manner and based on the input for the area to which the layer of the second object belongs, a subordinate object that is not presented and is in the second object in the area to which the layer of the second object belongs, until the first object is presented on the display device, wherein before presenting the subordinate object in the second object in the area to which the layer of the second object belongs, presenting the first object set on the display device in the hierarchical manner of the application layer, the virtual layer, and the physical layer comprises:

when the display device presents a peer object of the second object instead of presenting the second object, and the area to which the layer of the second object belongs presents a prompt indicating that not all subordinate objects in the superior object of the second object are presented, presenting, in a scroll manner and based on the input for the area to which the layer of the second object belongs, a subordinate object that is not presented and is comprised in the superior object of the second object in the area to which the layer of the second object belongs, until the second object is presented on the display device.

* * * * *